United States Patent
Wasa et al.

(10) Patent No.: US 11,732,075 B2
(45) Date of Patent: Aug. 22, 2023

(54) CYCLIC OLEFIN-BASED COPOLYMER, CYCLIC OLEFIN-BASED COPOLYMER COMPOSITION, MOLDED ARTICLE, AND MEDICAL CONTAINER

(71) Applicant: MITSUI CHEMICALS, INC., Tokyo (JP)

(72) Inventors: Hideki Wasa, Sodegaura (JP); Haruka Saito, Chiba (JP); Sunil Krzysztof Moorthi, Ichihara (JP); Futoshi Fujimura, Ichihara (JP); Masahiko Okamoto, Chiba (JP); Emi Oniki, Sodegaura (JP); Kouichi Kizu, Chiba (JP); Jiacheng He, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 587 days.

(21) Appl. No.: 16/766,838

(22) PCT Filed: Nov. 27, 2018

(86) PCT No.: PCT/JP2018/043621
§ 371 (c)(1),
(2) Date: May 26, 2020

(87) PCT Pub. No.: WO2019/107363
PCT Pub. Date: Jun. 6, 2019

(65) Prior Publication Data
US 2020/0369812 A1    Nov. 26, 2020

(30) Foreign Application Priority Data

Nov. 29, 2017 (JP) .................. 2017-228675
Jul. 24, 2018 (JP) .................. 2018-138691

(51) Int. Cl.
*C08F 210/02*    (2006.01)
*C08F 232/08*    (2006.01)
*C08F 232/00*    (2006.01)
*A61J 1/05*    (2006.01)
*B65D 65/38*    (2006.01)
*B65D 85/00*    (2006.01)
*G02B 1/04*    (2006.01)
*A61J 1/06*    (2006.01)
*A61J 1/10*    (2006.01)

(52) U.S. Cl.
CPC .............. *C08F 232/00* (2013.01); *A61J 1/05* (2013.01); *B65D 65/38* (2013.01); *B65D 85/70* (2013.01); *G02B 1/041* (2013.01); *A61J 1/06* (2013.01); *A61J 1/10* (2013.01); *C08F 210/02* (2013.01); *C08F 232/08* (2013.01); *C08F 2800/10* (2013.01)

(58) Field of Classification Search
None
See application file for complete search history.

(56) References Cited

U.S. PATENT DOCUMENTS

| | | | |
|---|---|---|---|
| 4,931,520 | A | 6/1990 | Yamanashi et al. |
| 5,003,019 | A | 3/1991 | Ishimaru et al. |
| 5,008,356 | A | 4/1991 | Ishimaru et al. |
| 6,063,886 | A | 5/2000 | Yamaguchi et al. |
| 8,883,925 | B2 | 11/2014 | Kizu et al. |
| 2010/0081768 | A1 | 4/2010 | Kizu et al. |

FOREIGN PATENT DOCUMENTS

| | | | |
|---|---|---|---|
| CN | 88101641 | A | 9/1988 |
| EP | 0726291 | A1 | 8/1996 |
| JP | 01185307 | A | 7/1989 |
| JP | 05310845 | A | 11/1993 |
| JP | 0857051 | A | 3/1996 |
| JP | 8277353 | A | 10/1996 |
| JP | 10120768 | A | 5/1998 |
| JP | 10287713 | A | 10/1998 |
| JP | 2001026693 | A | 1/2001 |
| JP | 2005239975 | A | 9/2005 |
| JP | 2005239975 | A * | 9/2005 |
| JP | 2008179685 | A | 8/2008 |
| JP | 2009046614 | A | 3/2009 |
| JP | 2010235719 | A | 10/2010 |
| JP | 2010241932 | A | 10/2010 |
| JP | 2011052154 | A | 3/2011 |
| JP | 2014224169 | A | 12/2014 |
| WO | 2008068897 | A1 | 6/2008 |
| WO | 2014185253 | A1 | 11/2014 |

OTHER PUBLICATIONS

International Search Report (PCT/ISA/210) dated Mar. 5, 2019, by the Japanese Patent Office as the International Searching Authority for International Application No. PCT/JP2018/043621.
Office Action dated Jan. 20, 2021, by the Intellectual Property India in corresponding Indian Patent Application No. 202017025069, with an English translation of the Office Action. (6 pages).

* cited by examiner

*Primary Examiner* — Richard A Huhn
(74) *Attorney, Agent, or Firm* — Buchanan Ingersoll & Rooney PC

(57) ABSTRACT

Described is a cyclic olefin-based copolymer has a constitutional unit (A) derived from an α-olefin having 2 to 20 carbon atoms, a constitutional unit (B) derived from a cyclic olefin without an aromatic ring, and a constitutional unit (C) derived from a cyclic olefin having an aromatic ring. Also described is a medical container containing a cyclic olefin-based copolymer having a constitutional unit (A) derived from an α-olefin having 2 to 20 carbon atoms, a constitutional unit (B) derived from a cyclic olefin without an aromatic ring, and a constitutional unit (C) derived from a cyclic olefin having an aromatic ring.

22 Claims, No Drawings

CYCLIC OLEFIN-BASED COPOLYMER, CYCLIC OLEFIN-BASED COPOLYMER COMPOSITION, MOLDED ARTICLE, AND MEDICAL CONTAINER

TECHNICAL FIELD

The present invention relates to a cyclic olefin-based copolymer, a cyclic olefin-based copolymer composition, a molded article, and a medical container.

BACKGROUND ART

In optical lenses such as an imaging lens, an fθ lens, and a pickup lens, a cyclic olefin-based polymer is used. The cyclic olefin-based polymer used in molded articles such as the optical lenses is required to have characteristics such as high transparency, excellent dimensional stability, and excellent heat resistance.

Furthermore, for miniaturization and thinning, the imaging lens used, for example, in smartphones, digital cameras, and the like is required to have a further improved refractive index while maintaining a low birefringence value.

Examples of techniques relating to the cyclic olefin-based polymer used in the optical lenses include those described in Patent Document 1 (Japanese Unexamined Patent Publication No. 10-287713) and Patent Document 2 (Japanese Unexamined Patent Publication No. 2010-235719).

Patent Document 1 describes a cyclic olefin-based copolymer obtained from (A) linear or branched α-olefin having 2 to 20 carbon atoms, (B) cyclic olefin represented by a predetermined chemical formula, and (C) aromatic vinyl compound, in which an intrinsic viscosity [η] of the copolymer is within a range of 0.1 to 10 dl/g, and a content ratio of a constitutional unit derived from (B) cyclic olefin and a content ratio of a constitutional unit derived from (C) aromatic vinyl compound satisfy a specific relationship.

Patent Document 2 describes a cyclic olefin-based polymer containing a constitutional unit (A), which is derived from ethylene or an α-olefin having 3 to 20 carbon atoms, at 30 to 70 mol %, a constitutional unit (B), which is derived from a cyclic olefin represented by a predetermined chemical formula, at 20 to 50 mol %, and a constitutional unit (C), which is derived from an aromatic vinyl compound, at 0.1 to 20 mol %, in which an intrinsic viscosity [η], $^1$H-NMR, and a glass transition temperature of the polymer meet a predetermined condition.

In a cyclic olefin-based resin, performances such as transparency and chemical resistance are excellently balanced. Accordingly, the use of the cyclic olefin-based resin as a material forming molded articles such as medical containers is under examination. Examples of techniques relating to a resin composition containing the cyclic olefin-based resin include those described in Patent Document 3 or Patent Document 4.

Patent Document 3 describes a cyclic olefin-based resin composition containing two kinds of specific cyclic olefin-based resins, and a method for obtaining a molded article having improved slip characteristics, transparency, excellent surface gloss, and excellently hygienic by using the composition.

Patent Document 4 describes a cyclic olefin-based resin composition including 60 to 90 parts by mass of a cyclic olefin-based resin and 10 to 40 parts by mass of an aromatic vinyl conjugated diene copolymer having a number-average molecular weight of 75,000 to 500,000 and/or a hydrogenated substance thereof. Patent Document 4 also described a method for obtaining a molded article having excellent impact resistance and excellent damp proofness by using the composition.

RELATED DOCUMENT

Patent Document

[Patent Document 1] Japanese Unexamined Patent Publication No. 10-287713
[Patent Document 2] Japanese Unexamined Patent Publication No. 2010-235719
[Patent Document 3] Japanese Unexamined Patent Publication No. 2001-26693
[Patent Document 4] Japanese Unexamined Patent Publication No. 8-277353

SUMMARY OF THE INVENTION

Technical Problem

According to the examination conducted by the inventors of the present invention, it has been revealed that for the uses such as optical lenses, in order to improve image quality and improve a degree of freedom in designing the optical lenses, a resin material of which the Abbe number can be adjusted to a value lower than the Abbe number of the conventional resin materials is required.

A first invention of the present application has been made in consideration of the circumstances described above, and an object thereof is to provide a cyclic olefin-based copolymer which has a high refractive index and of which the Abbe number can be adjusted to a value lower than the Abbe number of the conventional resin materials.

Generally, medical containers such as a syringe and a liquid medicine storage container are filled with contents after being sterilized. During the sterilization, sometimes the containers are irradiated with electron beams or γ-rays.

According to the examination conducted by the inventors of the present invention, it has been revealed that in a case where the medical containers, in which the conventional cyclic olefin-based resin is used, are irradiated with electron beams or γ-rays, sometimes the containers are discolored.

A second invention of the present application has been made in consideration of the circumstances described above. That is, an object of the second invention of the present application is to provide a medical container which is hardly discolored even though being irradiated with electron beams or γ-rays and has excellent transparency.

Solution to Problem

In order to achieve the object of the first invention of the present application, the inventors of the present invention conducted an intensive examination. As a result, the inventors have found that in a case where a cyclic olefin-based copolymer is used which has a constitutional unit derived from an ethylene, a constitutional unit derived from at least one kind of compound selected from bicyclo[2.2.1]-2-heptene and tetracyclo[4.4.0.1$^{2,5}$.1$^{7,10}$]-3-dodecene, and a constitutional unit derived from a cyclic olefin having an aromatic ring, it is possible to adjust the Abbe number of the copolymer to a value lower than the Abbe number of conventional resin materials while maintaining a high refractive index. Based on this finding, the inventors have accomplished the first invention of the present application.

That is, according to the first invention of the present application, there is provided a cyclic olefin-based copolymer, a cyclic olefin-based copolymer composition, and a molded article described below.

[1] A cyclic olefin-based copolymer having a constitutional unit (A) derived from an α-olefin having 2 to 20 carbon atoms, a constitutional unit (B) derived from a cyclic olefin without an aromatic ring, and a constitutional unit (C) derived from a cyclic olefin having an aromatic ring.

[2] The cyclic olefin-based copolymer described in [1], in which in a case where a total content of the constitutional unit (A), the constitutional unit (B), and the constitutional unit (C) in the cyclic olefin-based copolymer is 100 mol %, a content of the constitutional unit (A) in the cyclic olefin-based copolymer is equal to or greater than 10 mol % and equal to or smaller than 80 mol %.

[3] The cyclic olefin-based copolymer described in [1] or [2], in which in a case where a total content of the constitutional unit (B) and the constitutional unit (C) in the cyclic olefin-based copolymer is 100 mol %, a content of the constitutional unit (C) in the cyclic olefin-based copolymer is equal to or greater than 5 mol % and equal to or smaller than 95 mol %.

[4] The cyclic olefin-based copolymer described in any one of [1] to [3], in which the cyclic olefin without an aromatic ring is a compound represented by the following Formula (B-1).

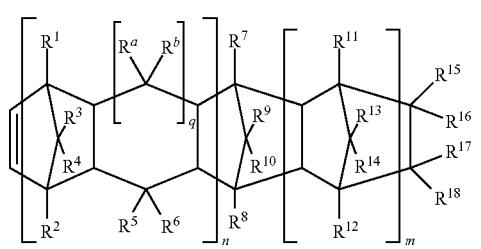

(B-1)

(In Formula (B-1), n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, $R^{15}$ and $R^{16}$ or $R^{17}$ and $R^{18}$ may form an alkylidene group, and the compound represented by Formula [B-1] does not have an aromatic ring.)

[5] The cyclic olefin-based copolymer described in any one of [1] to [4], in which the cyclic olefin having an aromatic ring contains one kind of compound or two or more kinds of compounds selected from the group consisting of a compound represented by the following Formula (C-1), a compound represented by the following Formula (C-2), and a compound represented by the following Formula (C-3).

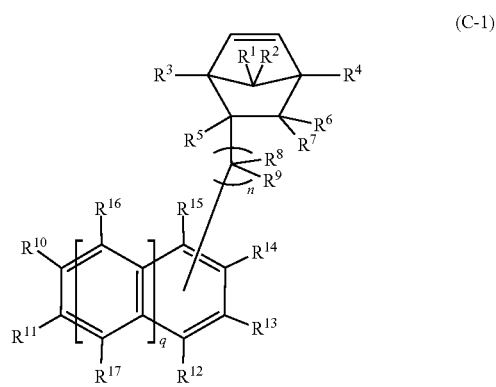

(C-1)

(In Formula (C-1), n and q each independently represent 0, 1, or 2, $R^1$ to $R^{17}$ each independently represent a hydrogen atom, a halogen atom except for a fluorine atom, or a hydrocarbon group having 1 to 20 carbon atoms that may be substituted with a halogen atom except for a fluorine atom, one of $R^{10}$ to $R^{17}$ is a bond, in a case where q=0, $R^{10}$ and $R^{11}$, $R^{11}$ and $R^{12}$, $R^{12}$ and $R^{13}$, $R^{13}$ and $R^{14}$, $R^{14}$ and $R^{15}$, or $R^{15}$ and $R^{10}$ may form a monocyclic ring or a polycyclic ring by being bonded to each other, in a case where q=1 or 2, $R^{10}$ and $R^{11}$, $R^{11}$ and $R^{17}$, $R^{17}$ and $R^{17}$, $R^{17}$ and $R^{12}$, $R^{12}$ and $R^{13}$, $R^{13}$ and $R^{14}$, $R^{14}$ and $R^{15}$, $R^{15}$ and $R^{16}$, $R^{16}$ and $R^{16}$, or $R^{16}$ and $R^{10}$ may form a monocyclic ring or a polycyclic ring by being bonded to each other, the monocyclic ring or the polycyclic ring may have a double bond, and the monocyclic ring or the polycyclic ring may be an aromatic ring.)

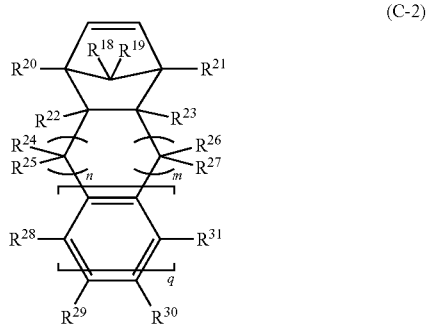

(C-2)

(In Formula (C-2), n and m each independently represent 0, 1, or 2, q represents 1, 2, or 3, $R^{18}$ to $R^{31}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{28}$ and $R^{29}$, $R^{29}$ and $R^{30}$, or $R^{30}$ and $R^{31}$ may form a monocyclic ring or a polycyclic ring by being bonded to each other, in a case where q=2 or 3, $R^{28}$ and $R^{28}$, $R^{28}$ and $R^{29}$, $R^{29}$ and $R^{30}$, $R^{30}$ and $R^{31}$, or $R^{31}$ and $R^{31}$ may form a monocyclic ring or a polycyclic ring, the monocyclic ring or the polycyclic ring may have a double bond, and the monocyclic ring or the polycyclic ring may be an aromatic ring.)

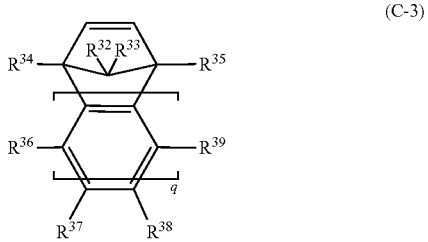

(In Formula (C-3), q represents 1, 2, or 3, $R^{32}$ to $R^{39}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{36}$ and $R^{37}$, $R^{37}$ and $R^{38}$, or $R^{38}$ and $R^{39}$ may form a monocyclic ring or a polycyclic ring by being bonded to each other, in a case where q=2 or 3, $R^{36}$ and $R^{36}$, $R^{36}$ and $R^{37}$, $R^{37}$ and $R^{38}$, $R^{38}$ and $R^{39}$, or $R^{39}$ and $R^{39}$ may form a monocyclic ring or a polycyclic ring by being bonded to each other, the monocyclic ring or the polycyclic ring may have a double bond, and the monocyclic ring or the polycyclic ring may be an aromatic ring.)

[6] The cyclic olefin-based copolymer described in any one of [1] to [5], in which in a case where an injection molding sheet having a thickness of 1.0 mm is prepared using the cyclic olefin-based copolymer, an Abbe number (ν) of the injection molding sheet is equal to or greater than 35 and equal to or smaller than 55.

[7] The cyclic olefin-based copolymer described in any one of [1] to [6], in which a glass transition temperature (Tg) of the cyclic olefin-based copolymer measured using a differential scanning calorimeter (DSC) is equal to or higher than 120° C. and equal to or lower than 180° C.

[8] The cyclic olefin-based copolymer described in any one of [1] to [7], in which an intrinsic viscosity [η] of the copolymer measured in decalin at 135° C. is equal to or higher than 0.05 dl/g and equal to or lower than 5.0 dl/g.

[9] The cyclic olefin-based copolymer described in any one of [1] to [8], in which in a case where an injection molding sheet having a thickness of 1.0 mm is prepared using the cyclic olefin-based copolymer, a birefringence of the injection molding sheet is equal to or higher than 1 nm and equal to or lower than 200 nm.

[10] The cyclic olefin-based copolymer described in any one of [1] to [9], in which the cyclic olefin having an aromatic ring contains at least one kind of compound selected from benzonorbornadiene, indene norbornene, and methyl phenyl norbornene.

[11] A cyclic olefin-based copolymer composition containing the cyclic olefin-based copolymer described in any one of [1] to [10].

[12] The cyclic olefin-based copolymer composition described in [11], further containing a hydrophilic stabilizer.

[13] A molded article containing the cyclic olefin-based copolymer described in any one of [1] to [10] or the cyclic olefin-based copolymer composition described in [11] or [12].

[14] The molded article described in [13] that is an optical lens.

Furthermore, in order to achieve the object relating to the second invention of the present application, the inventors of the present invention conducted an intensive examination. As a result, the inventors have found that in a case where a cyclic olefin-based copolymer, which contains a constitutional unit derived from an α-olefin, a constitutional unit derived from a cyclic olefin without an aromatic ring, and a constitutional unit derived from a cyclic olefin having an aromatic ring, is used as a resin constituting a medical container, the object can be achieved. Based on the finding, the inventors have accomplished the second invention of the present application described below.

That is, according to the second invention of the present application, there are provided a medical container and a cyclic olefin-based copolymer composition for a medical container described below.

[15] A medical container containing a cyclic olefin-based copolymer that has a constitutional unit (A) derived from an α-olefin having 2 to 20 carbon atoms, a constitutional unit (B) derived from a cyclic olefin without an aromatic ring, and a constitutional unit (C) derived from a cyclic olefin having an aromatic ring.

[16] The medical container described in [15], in which in a case where a total content of the constitutional unit (A), the constitutional unit (B), and the constitutional unit (C) in the cyclic olefin-based copolymer is 100 mol %, a content of the constitutional unit (C) in the cyclic olefin-based copolymer is equal to or greater than 0.1 mol % and equal to or smaller than 50 mol %.

[17] The medical container described in [15] or [16], in which in a case where a total content of the constitutional unit (B) and the constitutional unit (C) in the cyclic olefin-based copolymer is 100 mol %, a content of the constitutional unit (C) in the cyclic olefin-based copolymer is equal to or greater than 5 mol % and equal to or smaller than 95 mol %.

[18] The medical container described in any one of [15] to [17], in which in a case where a total content of the constitutional unit (A), the constitutional unit (B), and the constitutional unit (C) in the cyclic olefin-based copolymer is 100 mol %, a content of the constitutional unit (A) in the cyclic olefin-based copolymer is equal to or greater than 10 mol % and equal to or smaller than 80 mol %.

[19] The medical container described in any one of [15] to [18], in which the cyclic olefin without an aromatic ring is a compound represented by the following Formula (B-1).

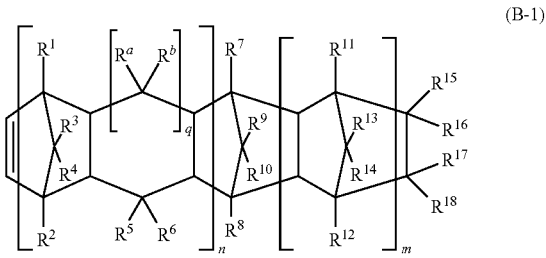

(In Formula [B-1], n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, $R^{15}$ and $R^{16}$ or $R^{17}$ and $R^{18}$ may form an alkylidene group, and the compound represented by Formula [B-1] does not have an aromatic ring.)

[20] The medical container described in any one of [15] to [19], in which the cyclic olefin having an aromatic ring contains one kind of compound or two or more kinds of compounds selected from the group consisting of a compound represented by the following Formula (C-1), a compound represented by the following Formula (C-2), and a compound represented by the following Formula (C-3).

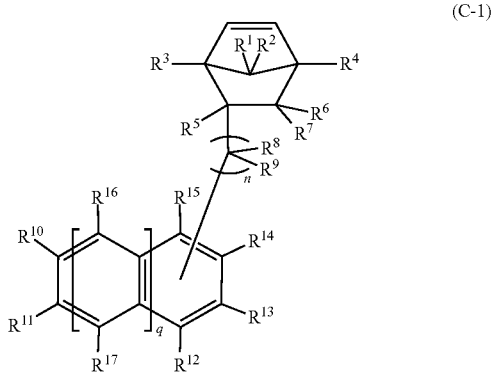

(C-1)

(In Formula (C-1), n and q each independently represent 0, 1, or 2, $R^1$ to $R^{17}$ each independently represent a hydrogen atom, a halogen atom except for a fluorine atom, or a hydrocarbon group having 1 to 20 carbon atoms that may be substituted with a halogen atom except for a fluorine atom, one of $R^{10}$ to $R^{17}$ is a bond, in a case where q=0, $R^{10}$ and $R^{11}$, $R^{11}$ and $R^{12}$, $R^{12}$ and $R^{13}$, $R^{13}$ and $R^{14}$, $R^{14}$ and $R^{15}$, or $R^{15}$ and $R^{10}$ may form a monocyclic ring or a polycyclic ring by being bonded to each other, in a case where q=1 or 2, $R^{10}$ and $R^{11}$, $R^{11}$ and $R^{17}$, $R^{17}$ and $R^{17}$, $R^{17}$ and $R^{12}$, $R^{12}$ and $R^{13}$, $R^{13}$ and $R^{14}$, $R^{14}$ and $R^{15}$, $R^{15}$ and $R^{16}$, $R^{16}$ and $R^{16}$, or $R^{16}$ and $R^{10}$ may form a monocyclic ring or a polycyclic ring by being bonded to each other, the monocyclic ring or the polycyclic ring may have a double bond, and the monocyclic ring or the polycyclic ring may be an aromatic ring.)

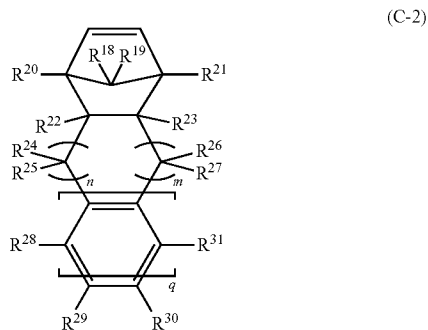

(C-2)

(In Formula (C-2), n and m each independently represent 0, 1, or 2, q represents 1, 2, or 3, $R^{18}$ to $R^{31}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{28}$ and $R^{29}$, $R^{29}$ and $R^{30}$, or $R^{30}$ and $R^{31}$ may form a monocyclic ring or a polycyclic ring by being bonded to each other, in a case where q=2 or 3, $R^{28}$ and $R^{28}$, $R^{28}$ and $R^{29}$, $R^{29}$ and $R^{30}$, $R^{30}$ and $R^{31}$, or $R^{31}$ and $R^{31}$ may form a monocyclic ring or a polycyclic ring by being bonded to each other, the monocyclic ring or the polycyclic ring may have a double bond, and the monocyclic ring or the polycyclic ring may be an aromatic ring.)

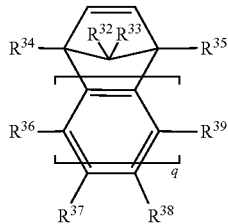

(C-3)

(In Formula (C-3), q represents 1, 2, or 3, $R^{32}$ to $R^{39}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{36}$ and $R^{37}$, $R^{37}$ and $R^{38}$, or $R^{38}$ and $R^{39}$ may form a monocyclic ring or a polycyclic ring by being bonded to each other, in a case where q=2 or 3, $R^{36}$ and $R^{36}$, $R^{36}$ and $R^{37}$, $R^{37}$ and $R^{38}$, $R^{38}$ and $R^{39}$, or $R^{39}$ and $R^{39}$ may form a monocyclic ring or a polycyclic ring by being bonded to each other, the monocyclic ring or the polycyclic ring may have a double bond, and the monocyclic ring or the polycyclic ring may be an aromatic ring.)

[21] The medical container described in any one of [15] to [20], in which a glass transition temperature (Tg) of the cyclic olefin-based copolymer measured using a differential scanning calorimeter (DSC) is equal to or higher than 120° C. and equal to or lower than 180° C.

[22] The medical container described in any one of [15] to [21], in which an intrinsic viscosity [η] of the cyclic olefin-based copolymer measured in decalin at 135° C. is equal to or higher than 0.05 dl/g and equal to or lower than 5.0 dl/g.

[23] The medical container described in any one of [15] to [22], in which the cyclic olefin having an aromatic ring contains at least one kind of compound selected from benzonorbornadiene, indene norbornene, and methyl phenyl norbornene.

[24] The medical container described in any one of [15] to [23] that is a syringe or a liquid medicine storage container.

[25] A cyclic olefin-based copolymer composition for a medical container that is used for forming a medical container, containing a cyclic olefin-based copolymer that has a constitutional unit (A) derived from an α-olefin having 2 to 20 carbon atoms, a constitutional unit (B) derived from a cyclic olefin without an aromatic ring, and a constitutional unit (C) derived from a cyclic olefin having an aromatic ring.

[26] The cyclic olefin-based copolymer composition for a medical container described in [25], in which in a case where a total content of the constitutional unit (A), the constitutional unit (B), and the constitutional unit (C) in the cyclic olefin-based copolymer is 100 mol %, a content of the constitutional unit (C) in the cyclic olefin-based copolymer is equal to or greater than 0.1 mol % and equal to or smaller than 50 mol %.

[27] The cyclic olefin-based copolymer composition for a medical container described in [25] or [26], in which in a case where a total content of the constitutional unit (A), the constitutional unit (B), and the constitutional unit (C) in the cyclic olefin-based copolymer is 100 mol %, a content of the constitutional unit (A) in the cyclic olefin-based copolymer is equal to or greater than 10 mol % and equal to or smaller than 80 mol %.

[28] The cyclic olefin-based copolymer composition for a medical container described in any one of [25] to [27], in which the cyclic olefin without an aromatic ring is a compound represented by the following Formula (B-1).

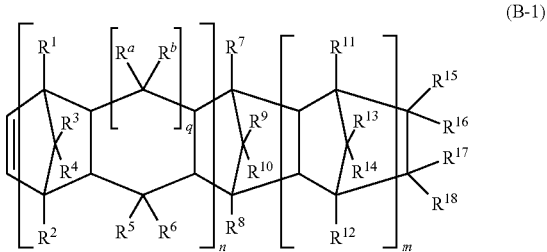

(B-1)

(In Formula [B-1], n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, $R^{15}$ and $R^{16}$ or $R^{17}$ and $R^{18}$ may form an alkylidene group, and the compound represented by Formula [B-1] does not have an aromatic ring.)

[29] The cyclic olefin-based copolymer composition for a medical container described in any one of [25] to [28], in which the cyclic olefin having an aromatic ring contains one kind of compound or two or more kinds of compounds selected from the group consisting of a compound represented by the following Formula (C-1), a compound represented by the following Formula (C-2), and a compound represented by the following Formula (C-3).

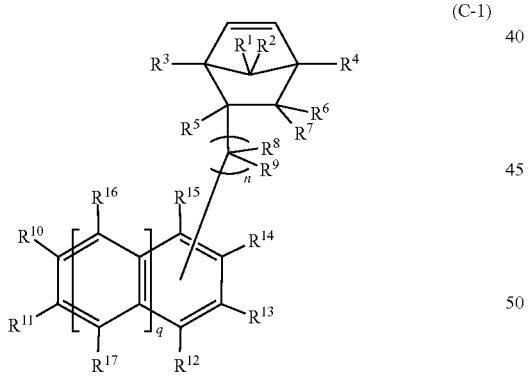

(C-1)

(In Formula (C-1), n and q each independently represent 0, 1, or 2, $R^1$ to $R^{17}$ each independently represent a hydrogen atom, a halogen atom except for a fluorine atom, or a hydrocarbon group having 1 to 20 carbon atoms that may be substituted with a halogen atom except for a fluorine atom, one of $R^{10}$ to $R^{17}$ is a bond, in a case where q=0, $R^{10}$ and $R^{11}$, $R^{11}$ and $R^{12}$, $R^{12}$ and $R^{13}$, $R^{13}$ and $R^{14}$, $R^{14}$ and $R^{15}$, or $R^{15}$ and $R^{10}$ may form a monocyclic ring or a polycyclic ring by being bonded to each other, in a case where q=1 or 2, $R^{10}$ and $R^{11}$, $R^{11}$ and $R^{17}$, $R^{17}$ and $R^{17}$, $R^{17}$ and $R^{12}$, $R^{12}$ and $R^{13}$, $R^{13}$ and $R^{14}$, $R^{14}$ and $R^{15}$, $R^{15}$ and $R^{16}$, $R^{16}$ and $R^{16}$, or $R^{16}$ and $R^{10}$ may form a monocyclic ring or a polycyclic ring by being bonded to each other, the monocyclic ring or the polycyclic ring may have a double bond, and the monocyclic ring or the polycyclic ring may be an aromatic ring.)

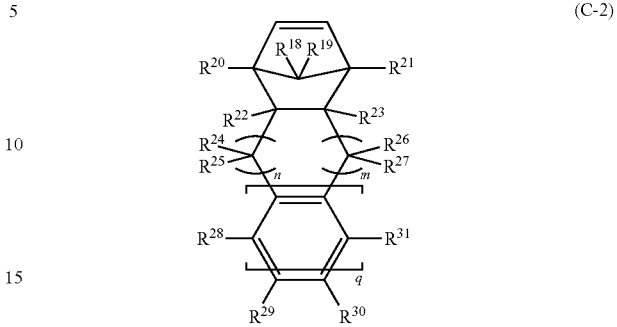

(C-2)

(In Formula (C-2), n and m each independently represent 0, 1, or 2, q represents 1, 2, or 3, $R^{18}$ to $R^{31}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{28}$ and $R^{29}$, $R^{29}$ and $R^{30}$, or $R^{30}$ and $R^{31}$ may form a monocyclic ring or a polycyclic ring by being bonded to each other, in a case where q=2 or 3, $R^{28}$ and $R^{28}$, $R^{28}$ and $R^{29}$, $R^{29}$ and $R^{30}$, $R^{30}$ and $R^{31}$, or $R^{31}$ and $R^{31}$ may form a monocyclic ring or a polycyclic ring by being bonded to each other, the monocyclic ring or the polycyclic ring may have a double bond, and the monocyclic ring or the polycyclic ring may be an aromatic ring.)

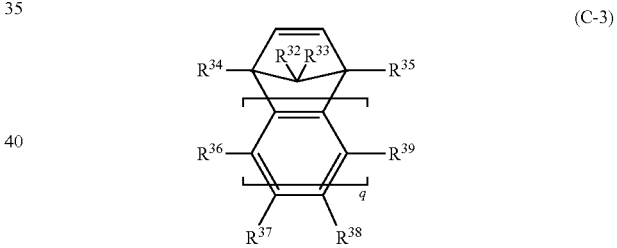

(C-3)

(In Formula (C-3), q represents 1, 2, or 3, $R^{32}$ to $R^{39}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{36}$ and $R^{37}$, $R^{37}$ and $R^{38}$, or $R^{38}$ and $R^{39}$ may form a monocyclic ring or a polycyclic ring by being bonded to each other, in a case where q=2 or 3, $R^{36}$ and $R^{36}$, $R^{36}$ and $R^{37}$, $R^{37}$ and $R^{38}$, $R^{38}$ and $R^{39}$, or $R^{39}$ and $R^{39}$ may form a monocyclic ring or a polycyclic ring by being bonded to each other, the monocyclic ring or the polycyclic ring may have a double bond, and the monocyclic ring or the polycyclic ring may be an aromatic ring.)

[30] The cyclic olefin-based copolymer composition for a medical container described in any one of [25] to [29], in which a glass transition temperature (Tg) of the cyclic olefin-based copolymer measured using a differential scanning calorimeter (DSC) is equal to or higher than 120° C. and equal to or lower than 180° C.

[31] The cyclic olefin-based copolymer composition for a medical container described in any one of [25] to [30], in which an intrinsic viscosity [η] of the cyclic olefin-based copolymer measured in decalin at 135° C. is equal to or higher than 0.05 dl/g and equal to or lower than 5.0 dl/g.

[32] The cyclic olefin-based copolymer composition for a medical container described in any one of [25] to [31], in which the cyclic olefin having an aromatic ring contains at least one kind of compound selected from benzonorbornadiene, indene norbornene, and methyl phenyl norbornene.

[33] The cyclic olefin-based copolymer composition for a medical container described in any one of [25] to [32], in which the container is a syringe or a liquid medicine storage container.

Advantageous Effects of Invention

According to the first invention of the present application, it is possible to provide a cyclic olefin-based copolymer which has a high refractive index and of which the Abbe number can be adjusted to a value lower than the Abbe number of the conventional resin materials.

According to the second invention of the present application, it is possible to provide a medical container which is hardly discolored even though being irradiated with electron beams or γ-rays and has excellent transparency.

DESCRIPTION OF EMBODIMENTS

Hereinafter, the present invention will be described based on embodiments. In the present embodiments, unless otherwise specified, "A to B" that indicates a range of numerical values represents "equal to or greater than A and equal to or smaller than B".

1. First invention
[Cyclic Olefin-Based Copolymer]
First, a cyclic olefin-based copolymer (P) of an embodiment according to the first invention will be described.

The cyclic olefin-based copolymer (P) according to the present embodiment has a constitutional unit (A) derived from an α-olefin having 2 to 20 carbon atoms, a constitutional unit (B) derived from a cyclic olefin without an aromatic ring, and a constitutional unit (C) derived from a cyclic olefin having an aromatic ring.

The cyclic olefin-based copolymer (P) according to the present embodiment has the constitutional unit (A) derived from an α-olefin having 2 to 20 carbon atoms, the constitutional unit (B) derived from a cyclic olefin without an aromatic ring, and the constitutional unit (C) derived from a cyclic olefin having an aromatic ring. Therefore, the copolymer (P) satisfies a high refractive index required to optical lenses and the like, and the Abbe number of the copolymer can be adjusted to a low value.

Therefore, in a case where the cyclic olefin-based copolymer (P) according to the present embodiment is used, it is possible to obtain a molded article which has a high refractive index and an Abbe number lower than the Abbe number of the conventional resin materials.

(Constitutional Unit (A) Derived from Ethylene)
The constitutional unit (A) according to the present embodiment is a constitutional unit derived from an α-olefin having 2 to 20 carbon atoms.

The α-olefin having 2 to 20 carbon atoms may be linear or branched, and examples thereof include a linear α-olefin having 2 to 20 carbon atoms such as ethylene, propylene, 1-butene, 1-pentene, 1-hexene, 1-octene, 1-decene, 1-dodecene, 1-tetradecene, 1-hexadecene, 1-octadecene, or 1-eicosene; a branched α-olefin having 4 to 20 carbon atoms such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, or 3-ethyl-1-hexene; and the like. Among these, a linear α-olefin having 2 to 4 carbon atoms is preferable, and ethylene is particularly preferable. One kind of each of these linear or branched α-olefins may be used singly, or two or more kinds of these linear or branched α-olefins may be used in combination.

In a case where the total content of the constitutional unit (A), the constitutional unit (B), and the constitutional unit (C) in the cyclic olefin-based copolymer (P) according to the present embodiment is 100 mol %, the content of the constitutional unit (A) in the cyclic olefin-based copolymer (P) according to the present embodiment is preferably equal to or greater than 10 mol % and equal to or smaller than 80 mol %, more preferably equal to or greater than 30 mol % and equal to or smaller than 75 mol %, and even more preferably equal to or greater than 40 mol % and equal to or smaller than 70 mol %.

In a case where the content of the constitutional unit (A) is equal to or greater than the lower limit described above, the heat resistance or the dimensional stability of the obtained molded article can be improved. Furthermore, in a case where the content of the constitutional unit (A) is equal to or smaller than the upper limit described above, the transparency of the obtained molded article and the like can be improved.

In the present embodiment, the content of the constitutional unit (A) can be measured, for example, by $^1$H-NMR or $^{13}$C-NMR.

(Constitutional Unit (B) Derived from Cyclic Olefin)
The constitutional unit (B) according to the present embodiment is a constitutional unit derived from a cyclic olefin without an aromatic ring. From the viewpoint of further improving the refractive index of the obtained molded article, it is preferable that the constitutional unit (B) according to the present embodiment contains a constitutional unit derived from a compound represented by the following Formula (B-1).

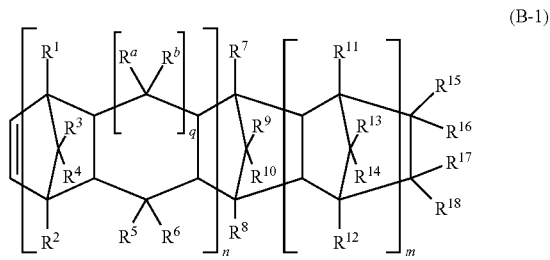

(B-1)

(In Formula [B-1], n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, $R^{15}$ and $R^{16}$ or $R^{17}$ and $R^{18}$ may form an alkylidene group, and the compound represented by Formula [B-1] does not have an aromatic ring.)

The constitutional unit (B) according to the present embodiment preferably contains at least one kind of constitutional unit selected from a constitutional unit derived from bicyclo[2.2.1]-2-heptene, a constitutional unit derived from tetracyclo[4.4.0.1$^{2,5}$.1$^{7,10}$]-3-dodecene, a constitutional unit derived from hexacyclo[6,6,1,13,6,1$^{10,13}$, 0$^{2,7,}$ 0$^{9,14}$]hepta-decene-4, and the like, more preferably contains at least one kind of constitutional unit selected from bicyclo[2.2.1]-2-heptene and a constitutional unit derived from tetracyclo [4.4.0.1$^{2,5}$.1$^{7,10}$]-3-dodecene, and particularly preferably contains a constitutional unit derived from tetracyclo [4.4.0.1$^{2,5}$.1$^{7,10}$]-3-dodecene.

(Constitutional Unit (C) Derived from Cyclic Olefin Having Aromatic Ring)

The constitutional unit (C) according to the present embodiment is a constitutional unit derived from a cyclic olefin having an aromatic ring.

Examples of the cyclic olefin having an aromatic ring according to the present embodiment include a compound represented by the following Formula (C-1), a compound represented by the following Formula (C-2), a compound represented by the following Formula (C-3), and the like. One kind of each of these cyclic olefins having an aromatic ring may be used singly, or two or more kinds of these cyclic olefins having an aromatic ring may be used in combination.

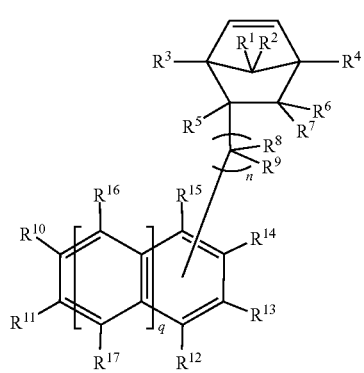

(C-1)

In Formula (C-1), n and q each independently represent 0, 1, or 2. n preferably represents 0 or 1, and more preferably represents 0. q preferably represents 0 or 1, and more preferably represents 0.

$R^1$ to $R^{17}$ each independently represent a hydrogen atom, a halogen atom except for a fluorine atom, or a hydrocarbon group having 1 to 20 carbon atoms that may be substituted with a halogen atom except for a fluorine atom. One of $R^{10}$ to $R^{17}$ is a bond, and it is preferable that $R^{15}$ is a bond.

$R^1$ to $R^{17}$ preferably each independently represent a hydrogen atom or a hydrocarbon group having 1 to 20 carbon atoms, and more preferably each independently represent a hydrogen atom.

In a case where q=0, $R^{10}$ and $R^{11}$, $R^{11}$ and $R^{12}$, $R^{12}$ and $R^{13}$, $R^{13}$ and $R^{14}$, $R^{14}$ and $R^{15}$, or $R^{15}$ and $R^{10}$ may form a monocyclic ring or a polycyclic ring by being bonded to each other. In a case where q=1 or 2, $R^{10}$ and $R^{11}$, $R^{11}$ and $R^{17}$, $R^{17}$ and $R^{17}$, $R^{17}$ and $R^{12}$, $R^{12}$ and $R^{13}$, $R^{13}$ and $R^{14}$, $R^{14}$ and $R^{15}$, $R^{15}$ and $R^{16}$, $R^{16}$ and $R^{16}$, or $R^{16}$ and $R^{10}$ may form a monocyclic ring or a polycyclic ring by being bonded to each other. The monocyclic ring or the polycyclic ring may have a double bond, and the monocyclic ring or the polycyclic ring may be an aromatic ring.

The Formula (C-1) is particularly preferably a compound represented by the following Formula (C-1A).

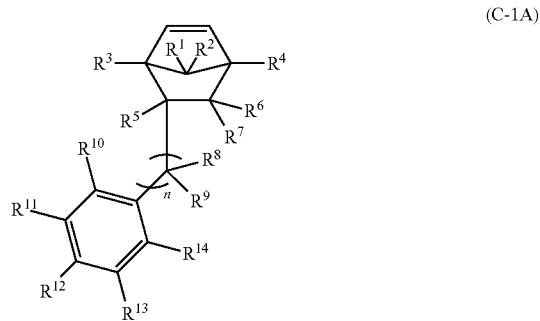

(C-1A)

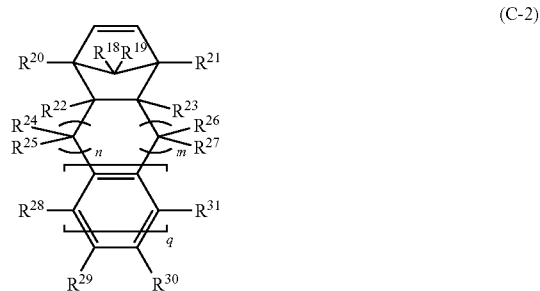

(C-2)

In Formula (C-2), n and m each independently represent 0, 1, or 2, q represents 1, 2, or 3. m preferably represents 0 or 1, and more preferably represents 1. n preferably represents 0 or 1, and more preferably represents 0. q preferably represents 1 or 2, and more preferably represents 1.

$R^{18}$ to $R^{31}$ each independently represent a hydrogen atom, a halogen atom except for a fluorine atom, or a hydrocarbon group having 1 to 20 carbon atoms that may be substituted with a halogen atom except for a fluorine atom.

$R^{18}$ to $R^{31}$ preferably each independently represent a hydrogen atom or a hydrocarbon group having 1 to 20 carbon atoms, and more preferably each independently represent a hydrogen atom.

In a case where q=1, $R^{28}$ and $R^{29}$, $R^{29}$ and $R^{30}$, or $R^{30}$ and $R^{31}$ may form a monocyclic ring or a polycyclic ring by being bonded to each other. In a case where q=2 or 3, $R^{28}$ and $R^{28}$, $R^{28}$ and $R^{29}$, $R^{29}$ and $R^{30}$, $R^{30}$ and $R^{31}$, or $R^{31}$ and $R^{31}$ may form a monocyclic ring or a polycyclic ring by being bonded to each other. The monocyclic ring or the polycyclic ring may have a double bond, and the monocyclic ring or the polycyclic ring may be an aromatic ring.

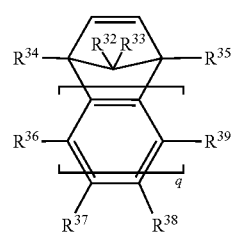

(C-3)

In Formula (C-3), q represents 1, 2, or 3. q preferably represents 1 or 2, and more preferably represents 1.

$R^{32}$ to $R^{39}$ each independently represent a hydrogen atom, a halogen atom except for a fluorine atom, or a hydrocarbon group having 1 to 20 carbon atoms that may be substituted with a halogen atom except for a fluorine atom.

$R^{32}$ to $R^{39}$ preferably each independently represent a hydrogen atom or a hydrocarbon group having 1 to 20 carbon atoms, and more preferably each independently represent a hydrogen atom.

In a case where q=1, $R^{36}$ and $R^{37}$, $R^{37}$ and $R^{38}$, or $R^{38}$ and $R^{39}$ may form a monocyclic ring or a polycyclic ring by being bonded to each other. In a case where q=2 or 3, $R^{36}$ and $R^{36}$, $R^{36}$ and $R^{37}$, $R^{37}$ and $R^{38}$, $R^{38}$ and $R^{39}$, or $R^{39}$ and $R^{39}$ may form a monocyclic ring or a polycyclic ring by being bonded to each other. The monocyclic ring or the polycyclic ring may have a double bond, and the monocyclic ring or the polycyclic ring may be an aromatic ring.

Examples of the hydrocarbon group having 1 to 20 carbon atoms include an alkyl group having 1 to 20 carbon atoms, a cycloalkyl group having 3 to 15 carbon atoms, an aromatic hydrocarbon group, and the like. More specifically, examples of the alkyl group include a methyl group, an ethyl group, a propyl group, an isopropyl group, an amyl group, a hexyl group, an octyl group, a decyl group, a dodecyl group, an octadecyl group, and the like. Examples of the cycloalkyl group include a cyclohexyl group and the like. Examples of the aromatic hydrocarbon group include an aryl group and an aralkyl group such as a phenyl group, a tolyl group, a naphthyl group, a benzyl group, and a phenyl ethyl group. These hydrocarbon groups may be substituted with a halogen atom except for a fluorine atom.

Among these, as the cyclic olefin having an aromatic ring according to the present embodiment, a cyclic olefin having one aromatic ring is preferable. For example, at least one kind of cyclic olefin selected from benzonorbornadiene, indene norbornene, and methyl phenyl norbornene is preferable.

Examples of the cyclic olefin having an aromatic ring according to the present embodiment also include a compound represented by the following Formula (C-1'), a compound represented by the following Formula (C-2'), a compound represented by the following Formula (C-3'), and the like. One kind of each of these cyclic olefins having an aromatic ring may be used singly, or two or more kinds of these cyclic olefins having an aromatic ring may be used in combination.

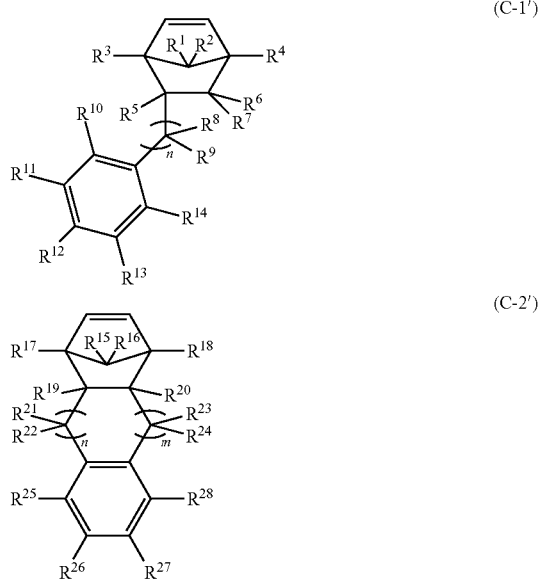

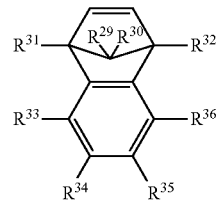

In Formula (C-1'), Formula (C-2'), and Formula (C-3'), m and n each represent 0, 1, or 2. $R^1$ to $R^{36}$ each independently represent a hydrogen atom, a halogen atom except for a fluorine atom, or a hydrocarbon group having 1 to 20 carbon atoms that may be substituted with a halogen atom except for a fluorine atom. $R^{10}$ and $R^{11}$, $R^{11}$ and $R^{12}$, $R^{12}$ and $R^{13}$, $R^{13}$ and $R^{14}$, $R^{25}$ and $R^{26}$, $R^{26}$ and $R^{27}$, $R^{27}$ and $R^{28}$, $R^{33}$ and $R^{34}$, $R^{34}$ and $R^{35}$, or $R^{35}$ and $R^{36}$ may form a monocyclic ring by being bonded to each other. The monocyclic ring may have a double bond.

In Formula (C-1'), Formula (C-2'), and Formula (C-3'), m preferably represents 0 or 1, and more preferably represents 1. n preferably represents 0 or 1, and more preferably represents 0. $R^1$ to $R^{36}$ preferably each represent a hydrogen atom or a hydrocarbon group having 1 to 20 carbon atoms, and more preferably each represent a hydrogen atom.

Examples of the hydrocarbon group having 1 to 20 carbon atoms include an alkyl group having 1 to 20 carbon atoms, a cycloalkyl group having 3 to 15 carbon atoms, an aromatic hydrocarbon group, and the like. More specifically, examples of the alkyl group include a methyl group, an ethyl group, a propyl group, an isopropyl group, an amyl group, a hexyl group, an octyl group, a decyl group, a dodecyl group, an octadecyl group, and the like. Examples of the cycloalkyl group include a cyclohexyl group. Examples of the aromatic hydrocarbon group include an aryl group and an aralkyl group such as a phenyl group, a tolyl group, a naphthyl group, a benzyl group, and a phenyl ethyl group. These hydrocarbon groups may be substituted with a halogen atom except for a fluorine atom.

Among these, as the cyclic olefin having an aromatic ring according to the present embodiment, a cyclic olefin having one aromatic ring is preferable. For example, at least one kind of cyclic olefin selected from benzonorbornadiene, indene norbornene, and methyl phenyl norbornene is preferable.

In a case where the total content of the constitutional unit (B) and the constitutional unit (C) in the cyclic olefin-based copolymer (P) according to the present embodiment is 100 mol %, the content of the constitutional unit (C) in the cyclic olefin-based copolymer (P) according to the present embodiment is preferably equal to or greater than 5 mol % and equal to or smaller than 95 mol %, more preferably equal to or greater than 10 mol % and equal to or smaller than 90 mol %, even more preferably equal to or greater than 20 mol % and equal to or smaller than 80 mol %, still more preferably equal to or greater than 30 mol % and equal to or smaller than 80 mol %, and yet more preferably equal to or greater than 40 mol % and equal to or smaller than 78 mol %.

In a case where the content of the constitutional unit (C) is equal to or greater than the lower limit described above, in the obtained molded article, the refractive index can be kept high while the Abbe number can be further reduced. Furthermore, in a case where the content of the constitutional unit (C) is equal to or smaller than the upper limit described above, the balance between the refractive index and the Abbe number in the obtained molded article can be further improved.

In the present embodiment, the content of the constitutional unit (B) and the constitutional unit (C) can be measured, for example, by $^1$H-NMR or $^{13}$C-NMR.

The copolymerization type of the cyclic olefin-based copolymer (P) according to the present embodiment is not particularly limited, and examples thereof include a random copolymer, a block copolymer, and the like. In the present embodiment, from the viewpoint of making it possible to obtain a molded article excellent in optical properties such as transparency, Abbe number, refractive index, and birefringence, as the cyclic olefin-based copolymer (P) according to the present embodiment, a random copolymer is preferable.

The cyclic olefin-based copolymer (P) according to the present embodiment can be manufactured, for example, by appropriately selecting conditions according to the methods described in Japanese Unexamined Patent Publication No. 60-168708, Japanese Unexamined Patent Publication No. 61-120816, Japanese Unexamined Patent Publication No. 61-115912, Japanese Unexamined Patent Publication No. 61-115916, Japanese Unexamined Patent Publication No. 61-271308, Japanese Unexamined Patent Publication No. 61-272216, Japanese Unexamined Patent Publication No. 62-252406, Japanese Unexamined Patent Publication No. 62-252407, Japanese Unexamined Patent Publication No. 2007-314806, Japanese Unexamined Patent Publication No. 2010-241932, and the like.

In a case where an injection molding sheet having a thickness of 1.0 mm is prepared using the cyclic olefin-based copolymer (P) according to the present embodiment, a refractive index (nd) of the injection molding sheet measured based on ASTM D542 at a wavelength of 589 nm is preferably equal to or higher than 1.545, preferably equal to or higher than 1.550, and more preferably equal to or higher than 1.555. The upper limit of the refractive index (nd) is not particularly limited, but is equal to or lower than 1.580 for example.

In a case where the refractive index is within the above range, it is possible to further reduce the thickness of the molded article, which is obtained using the cyclic olefin-based copolymer (P) according to the present embodiment, while maintaining excellent optical characteristics of the molded article.

From the viewpoint of further improving the transparency of the molded article obtained using the cyclic olefin-based copolymer (P) according to the present embodiment, in a case where an injection molding sheet which is formed of the cyclic olefin-based copolymer (P) and has a thickness of 1.0 mm is prepared, a haze of the injection molding sheet measured based on JIS K7136 is preferably less than 5%.

From the viewpoint of adjusting an Abbe number (ν) of a molded article, which is obtained using the cyclic olefin-based copolymer (P) according to the present embodiment, to a more suitable range, in a case where an injection molding sheet which is formed of the cyclic olefin-based copolymer (P) and has a thickness of 1.0 mm is prepared, the Abbe number (ν) of the injection molding sheet is preferably equal to or greater than 35 and equal to or smaller than 55, more preferably equal to or greater than 40 and equal to or smaller than 50, and even more preferably equal to or greater than 43 and equal to or smaller than 47.

The Abbe number (ν) of the injection molding sheet can be calculated from refractive indices of the injection molding sheet measured at 23° C. at wavelengths of 486 nm, 589 nm, and 656 nm by using the following equation.

$$\nu = (nD-1)/(nF-nC)$$

nD: refractive index at wavelength of 589 nm
nC: refractive index at wavelength of 656 nm
nF: refractive index at wavelength of 486 nm From the viewpoint of adjusting a birefringence of a molded article, which is obtained using the cyclic olefin-based copolymer (P) according to the present embodiment, to a more suitable range, in a case where an injection molding sheet which is formed of the cyclic olefin-based copolymer (P) and has a thickness of 1.0 mm is prepared, the birefringence of the injection molding sheet is preferably equal to or higher than 1 nm and equal to or lower than 200 nm.

In the present embodiment, the birefringence of the injection molding sheet is an average of phase differences of 20 to 35 mm from a gate direction that are measured at a measurement wavelength of 650 nm by using KOBRA CCD manufactured by Oji Scientific Instruments.

From the viewpoint of further improving the heat resistance of the obtained molded article while excellently maintaining the transparency, the haze, the Abbe number, the birefringence, and the refractive index of the molded article, a glass transition temperature (Tg) of the cyclic olefin-based copolymer (P) according to the present embodiment that is measured using a differential scanning calorimeter (DSC) is preferably equal to or higher than 120° C. and equal to or lower than 180° C., more preferably equal to or higher than 130° C. and equal to or lower than 170° C., and even more preferably equal to or higher than 140° C. and equal to or lower than 160° C.

An intrinsic viscosity [η] (in decalin at 135° C.) of the cyclic olefin-based copolymer (P) according to the present embodiment is, for example, 0.05 to 5.0 dl/g. The intrinsic viscosity [η] of the copolymer (P) is preferably 0.2 to 4.0 dl/g, more preferably 0.3 to 2.0 dl/g, and particularly preferably 0.4 to 1.0 dl/g.

[Cyclic Olefin-Based Copolymer Composition]

The cyclic olefin-based copolymer composition according to the present embodiment contains the cyclic olefin-based copolymer (P) according to the present embodiment. If necessary, the composition may contain other components in addition to the cyclic olefin-based copolymer (P). In the present embodiment, in a case where the cyclic olefin-based copolymer composition according to the present embodiment contains only the cyclic olefin-based copolymer (P), the composition is also called cyclic olefin-based copolymer composition.

The cyclic olefin-based copolymer composition according to the present embodiment may further contain a hydrophilic stabilizer. It is more preferable that the composition contains the hydrophilic stabilizer, because then the deterioration of optical performance under high-temperature and high-humidity conditions can be inhibited.

As the hydrophilic stabilizer, a fatty acid ester of a fatty acid and a polyhydric alcohol is preferable, and a fatty acid ester of a fatty acid and a polyhydric alcohol having one or more ether groups is more preferable.

Examples of the fatty acid ester include a monoglycerin fatty acid ester, a diglycerin fatty acid ester, a triglycerin fatty acid ester, pentaerythritol monostearate, pentaerythritol distearate, pentaerythritol tristearate, and the like.

The fatty acid ester of a fatty acid and a polyhydric alcohol having one or more ether groups is an ester of a fatty acid and a polyhydric alcohol having one or more ether groups. The ether groups in the polyhydric alcohol do not include an ether group in an ester group.

Examples of the polyhydric alcohol having one or more ether groups include monoglycerin, diglycerin, triglycerin, tetraglycerin, sorbitan, and the like.

In the present embodiment, the fatty acid ester preferably contains a monoglycerin fatty acid ester, a diglycerin fatty acid ester, and a triglycerin fatty acid ester. The diglycerin fatty acid ester is a compound formed in a case where at least one of four hydroxy groups contained in diglycerin is esterified with a fatty acid.

Examples of the fatty acid include a saturated fatty acid such as butanoic acid, pentanoic acid, hexanoic acid, heptanoic acid, octanoic acid, nonanoic acid, capric acid, lauric acid, myristic acid, palmitic acid, or stearic acid; a monounsaturated fatty acid such as crotonic acid, myristoleic acid, palmitoleic acid, sapienic acid, oleic acid, elaidic acid, gadoleic acid, or eicosenoic acid; a diunsaturated fatty acid such as linoleic acid, eicosadienoic acid, or docosadienoic acid; a triunsaturated fatty acid such as linolenic acid, pinolenic acid, eleostearic acid, or eicosatrienoic acid; a tetraunsaturated fatty acid such as stearidonic acid, arachidonic acid, or eicosatetraenoic acid; and the like.

Examples of the diglycerin fatty acid ester include a diglycerin saturated fatty acid ester such as diglycerin monocaprylate, diglycerin dicaprylate, diglycerin monocaprate, diglycerin dicaprate, diglycerin monolaurate, diglycerin dilaurate, diglycerin monomyristate, diglycerin dimyristate, diglycerin monopalmitate, diglycerin dipalmitate, diglycerin monostearate, diglycerin distearate, diglycerin monobehenate, or diglycerin dibehenate; a diglycerin unsaturated fatty acid ester such as diglycerin monooleate or diglycerin dioleate; and the like. One kind of compound selected from these may be used singly, or two or more kinds of compounds selected from these may be used in combination.

In the present embodiment, the diglycerin fatty acid ester is more preferably an ester of diglycerin and a saturated or unsaturated fatty acid having 12 to 18 carbon atoms selected from the above compounds.

From the viewpoint of the effects of the present embodiment, it is preferable that the cyclic olefin-based copolymer composition contains a diglycerin unsaturated fatty acid ester as a main component. Particularly, it is preferable that the composition contains diglycerin monooleate as a main component. The diglycerin skeleton is hydrophilic, and the fatty acid improves the compatibility with a resin. Therefore, the transparency is maintained, and the moist-heat resistance becomes excellent.

The cyclic olefin-based copolymer composition according to the present embodiment can contain at least one kind of diglycerin fatty acid ester. Examples of preferred aspects of the at least one kind of diglycerin fatty acid ester include a monoester used singly and a combination of a monoester and a diester.

The triglycerin fatty acid ester is an ester of a fatty acid and triglycerin.

The triglycerin fatty acid ester according to the present embodiment is a compound obtained in a case where at least one of five hydroxy groups contained in triglycerin is esterified with a fatty acid.

Examples of the triglycerin fatty acid ester include a triglycerin saturated fatty acid ester such as triglycerin monocaprylate, triglycerin dicaprylate, triglycerin tricaprylate triglycerin monocaprate, triglycerin dicaprate, triglycerin tricaprate, triglycerin monolaurate, triglycerin dilaurate, triglycerin trilaurate, triglycerin monomyristate, triglycerin dimyristate, triglycerin trimyristate, triglycerin monopalmitate, triglycerin dipalmitate, triglycerin tripalmitate, triglycerin monostearate, triglycerin distearate, triglycerin tristearate triglycerin monobehenate, triglycerin dibehenate, or triglycerin tribehenate; a triglycerin unsaturated fatty acid ester such as triglycerin monooleate, triglycerin dioleate, or triglycerin trioleate; and the like. One kind of compound selected from these may be used singly, or two or more kinds of compounds selected from these may be used in combination.

The triglycerin fatty acid ester according to the present embodiment preferably contains an ester of triglycerin and a saturated or unsaturated fatty acid having 8 to 24 carbon atoms, and more preferably contains an ester of triglycerin and a saturated or unsaturated fatty acid having 12 to 18 carbon atoms.

Examples of the triglycerin fatty acid ester according to the present embodiment include a monoester used singly, a mixture of a monoester and a diester, a mixture of a monoester, a diester, and a triester, and the like.

As the triglycerin fatty acid ester, for example, it is possible to use the compounds described in Japanese Unexamined Patent Publication No. 2006-232714, Japanese Unexamined Patent Publication No. 2002-275308, Japanese Unexamined Patent Publication No. 10-165152, and the like.

Examples of commercial products of the hydrophilic stabilizer according to the present embodiment include RIKEMAL DO-100 (manufactured by RIKEN VITAMIN Co., Ltd.), EXCEPARL PE-MS (manufactured by Kao Corporation), and the like.

In the cyclic olefin-based copolymer composition according to the present embodiment, the lower limit of the content of the hydrophilic stabilizer with respect to 100 parts by mass of the cyclic olefin-based copolymer (P) is preferably equal to or greater than 0.05 parts by mass, and more preferably equal to or greater than 0.4 parts by mass. The upper limit of the content of the hydrophilic stabilizer with respect to 100 parts by mass of the cyclic olefin-based copolymer (P) is preferably equal to or smaller than 3.0 parts by mass, more preferably equal to or smaller than 2.5 parts by mass, and even more preferably equal to or smaller than 1.2 parts by mass.

[Molded Article]

The molded article according to the present embodiment is a molded article containing the cyclic olefin-based copolymer (P) or the cyclic olefin-based copolymer composition according to the present embodiment.

The molded article according to the present embodiment contains the cyclic olefin-based copolymer (P) according to the present embodiment. Therefore, in the molded article, heat resistance, transparency, haze, birefringence, chemical resistance, low hygroscopicity, and the like are excellently balanced. Furthermore, the molded article has a higher refractive index and an Abbe number lower than the Abbe number of the conventional resin materials. Accordingly, the molded article is suited for being used as an optical lens.

The molded article according to the present embodiment has excellent optical characteristics. Therefore, the molded article can be suitably used as an optical lens such as a spectacle lens, an fθ lens, a pickup lens, an imaging lens, a sensor lens, a prism, a light guide plate, or an in-vehicle camera lens. Especially, because the molded article has a high refractive index and an Abbe number lower than the Abbe number of the conventional resin materials, the molded article can be particularly suitably used as an imaging lens.

A unit of imaging lenses is constituted with a plurality of lenses having different Abbe numbers and different refractive indices. Generally, a plurality of sheets of lenses having a large Abbe number and a small Abbe number are combined in the unit. The molded article according to the present embodiment can be suitably used as a lens corresponding to a region between a large Abbe number and a small Abbe number. Therefore, the molded article can improve a degree of freedom in designing a lens unit.

In a case where the total amount of the molded article is 100% by mass, from the viewpoint of further improving the balance among the performances such as transparency, haze, birefringence, Abbe number, and refractive index, the content of the cyclic olefin-based copolymer (P) in the molded article according to the present embodiment is preferably equal to or greater than 50% by mass and equal to or smaller than 100% by mass, more preferably equal to or greater than 70% by mass and equal to or smaller than 100% by mass, even more preferably equal to or greater than 80% by mass and equal to or smaller than 100% by mass, and particularly preferably equal to or greater than 90% by mass and equal to or smaller than 100% by mass.

The molded article according to the present embodiment can be obtained by molding a resin composition containing the cyclic olefin-based copolymer (P) in a predetermined shape. As the method for obtaining the molded article by molding the resin composition containing the cyclic olefin-based copolymer (P), known methods can be used without particular limitation. Although the method varies with the use and the shape of the molded article, for example, it is possible to use extrusion molding, injection molding, compression molding, inflation molding, blow molding, extrusion blow molding, injection blow molding, press molding, vacuum molding, powder slush molding, calendar molding, expansion molding, and the like. Among these, from the viewpoint of molding properties and productivity, an injection molding method is preferable. The molding conditions are appropriately selected according to the purpose of use and the molding method. For example, for injection molding, generally, the temperature of a resin is appropriately selected within a range of 150° C. to 400° C., preferably within a range of 200° C. to 350° C., and more preferably within a range of 230° C. to 330° C.

The molded article according to the present embodiment can be used in various forms such as the shapes of a lens, a sphere, a rod, a plate, a cylinder, a barrel, a tube, fiber, a film, and a sheet.

If necessary, as long as the excellent physical properties of the molded article according to the present embodiment are not impaired, as optional components, various additives can be incorporated into the molded article or the cyclic olefin-based copolymer composition according to the present embodiment. As the additives, for example, a phenol-based stabilizer, a higher fatty acid metal salt, an antioxidant, an ultraviolet absorber, a hindered amine-based light stabilizer, a hydrochloric acid absorber, a metal deactivator, an antistatic agent, an antifogging agent, a lubricant, a slip agent, a nucleating agent, a plasticizer, a flame retardant, a phosphorus-based stabilizer, and the like can be appropriately mixed with the molded article or the cyclic olefin-based copolymer composition to such a degree that does not impair the objects of the present invention. The proportion of the additives to be mixed may be appropriately set.

The optical lens according to the present embodiment may be made into an optical lens system by being combined with an optical lens different from the optical lens described above.

That is, the optical lens system according to the present embodiment includes a first optical lens, which is constituted with the molded article containing the cyclic olefin-based copolymer (P) according to the present embodiment, and a second optical lens different from the first optical lens.

The second optical lens is not particularly limited. For example, as the second optical lens, it is possible to use an optical lens constituted with at least one kind of resin selected from a polycarbonate resin and a polyester resin.

Hitherto, the embodiment of the first invention has been described. However, the embodiment is merely an example of the first invention, and various constitutions other than the above embodiment can also be adopted.

Furthermore, the first invention is not limited to the embodiment, and as long as the object of the first invention can be achieved, modification, amelioration, and the like are also included in the first invention.

2. Second Invention

[Cyclic Olefin-Based Copolymer]

First, a cyclic olefin-based copolymer (P) of an embodiment according to the second invention will be described.

The cyclic olefin-based copolymer (P) according to the present embodiment has a constitutional unit (A) derived from an α-olefin having 2 to 20 carbon atoms, a constitutional unit (B) derived from a cyclic olefin without an aromatic ring, and a constitutional unit (C) derived from a cyclic olefin having an aromatic ring.

The cyclic olefin-based copolymer (P) according to the present embodiment contains the constitutional unit (A) derived from an α-olefin having 2 to 20 carbon atoms, the constitutional unit (B) derived from a cyclic olefin without an aromatic ring, and the constitutional unit (C) derived from a cyclic olefin having an aromatic ring. Therefore, the cyclic olefin-based copolymer (P) can improve the radiation resistance of a medical container while maintaining excellent transparency.

Accordingly, in a case where the cyclic olefin-based copolymer (P) according to the present embodiment is used, it is possible to obtain a medical container which is hardly discolored even though being irradiated with electron beams or γ-rays and has excellent transparency.

(Constitutional Unit (A) Derived from Ethylene)

The constitutional unit (A) according to the present embodiment is a constitutional unit derived from an α-olefin having 2 to 20 carbon atoms.

The α-olefin having 2 to 20 carbon atoms may be linear or branched, and examples thereof include a linear α-olefin having 2 to 20 carbon atoms such as ethylene, propylene, 1-butene, 1-pentene, 1-hexene, 1-octene, 1-decene, 1-dodecene, 1-tetradecene, 1-hexadecene, 1-octadecene, or 1-eicosene; a branched α-olefin having 4 to 20 carbon atoms such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, or 3-ethyl-1-hexene; and the like. Among these, a linear α-olefin having 2 to 4 carbon atoms is preferable, and ethylene is particularly preferable. One kind of each of these linear or branched α-olefins may be used singly, or two or more kinds of these linear or branched α-olefins may be used in combination.

In a case where the total content of the constitutional unit (A), the constitutional unit (B), and the constitutional unit (C) in the cyclic olefin-based copolymer (P) according to the present embodiment is 100 mol %, the content of the constitutional unit (A) in the cyclic olefin-based copolymer (P) according to the present embodiment is preferably equal to or greater than 10 mol % and equal to or smaller than 80 mol %, more preferably equal to or greater than 30 mol % and equal to or smaller than 75 mol %, and even more preferably equal to or greater than 40 mol % and equal to or smaller than 70 mol %.

In a case where the content of the constitutional unit (A) is equal to or greater than the lower limit described above, the heat resistance or the dimensional stability of the medical container can be improved. Furthermore, in a case where the content of the constitutional unit (A) is equal to or smaller than the upper limit described above, the molding properties of the obtained medical container and the like can be improved.

In the present embodiment, the content of the constitutional unit (A) can be measured, for example, by $^1$H-NMR or $^{13}$C-NMR.

(Constitutional Unit (B) Derived from Cyclic Olefin)

The constitutional unit (B) according to the present embodiment is a constitutional unit derived from a cyclic olefin without an aromatic ring. From the viewpoint of further improving the refractive index of the medical container, it is preferable that the constitutional unit (B) according to the present embodiment contains a constitutional unit derived from a compound represented by the following Formula (B-1).

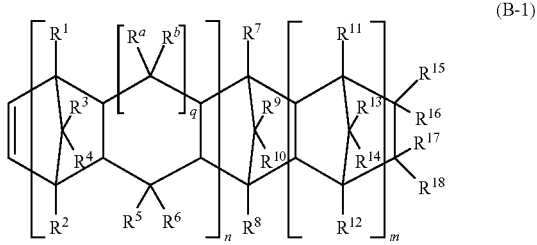

(B-1)

(In Formula [B-1], n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, $R^{15}$ and $R^{16}$ or $R^{17}$ and $R^{18}$ may form an alkylidene group, and the compound represented by Formula [B-1] does not have an aromatic ring.)

The constitutional unit (B) according to the present embodiment preferably contains at least one kind of constitutional unit selected from a constitutional unit derived from bicyclo[2.2.1]-2-heptene, a constitutional unit derived from tetracyclo[4.4.0.1$^{2,5}$.1$^{7,10}$]-3-dodecene, a constitutional unit derived from hexacyclo[6,6,1,1$^{3,6}$,1$^{10,13}$, 0$^{2,7}$, 0$^{9,14}$]heptadecene-4, and the like, more preferably contains at least one kind of constitutional unit selected from bicyclo[2.2.1]-2-heptene and a constitutional unit derived from tetracyclo[4.4.0.1$^{2,5}$.1$^{7,10}$]-3-dodecene, and particularly preferably contains a constitutional unit derived from tetracyclo[4.4.0.1$^{2,5}$.1$^{7,10}$]-3-dodecene.

In a case where the total content of the constitutional unit (A), the constitutional unit (B), and the constitutional unit (C) in the cyclic olefin-based copolymer (P) according to the present embodiment is 100 mol %, the content of the constitutional unit (B) in the cyclic olefin-based copolymer (P) is preferably equal to or greater than 5 mol % and equal to or smaller than 60 mol %, more preferably equal to or greater than 10 mol % and equal to or smaller than 55 mol %, and even more preferably equal to or greater than 15 mol % and equal to or smaller than 45 mol %.

In the present embodiment, the content of the constitutional unit (B) can be measured, for example, by $^1$H-NMR or $^{13}$C-NMR.

(Constitutional Unit (C) Derived from Cyclic Olefin Having Aromatic Ring)

The constitutional unit (C) according to the present embodiment is a constitutional unit derived from a cyclic olefin having an aromatic ring.

Examples of the cyclic olefin having an aromatic ring according to the present embodiment include a compound represented by the following Formula (C-1), a compound represented by the following Formula (C-2), a compound represented by the following Formula (C-3), and the like. One kind of each of these cyclic olefins having an aromatic ring may be used singly, or two or more kinds of these cyclic olefins having an aromatic ring may be used in combination.

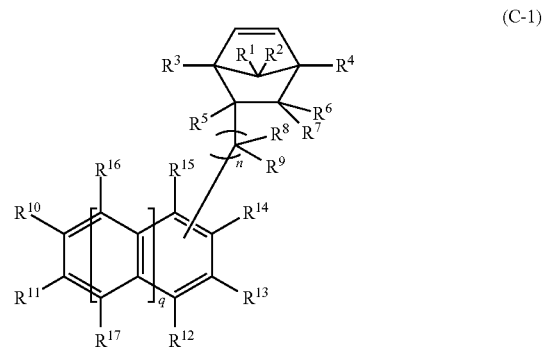

(C-1)

In Formula (C-1), n and q each independently represent 0, 1, or 2. n preferably represents 0 or 1, and more preferably represents 0. q preferably represents 0 or 1, and more preferably represents 0.

$R^1$ to $R^{17}$ each independently represent a hydrogen atom, a halogen atom except for a fluorine atom, or a hydrocarbon group having 1 to 20 carbon atoms that may be substituted with a halogen atom except for a fluorine atom. One of $R^{10}$ to $R^{17}$ is a bond, and it is preferable that $R^{15}$ is a bond.

$R^1$ to $R^{17}$ preferably each independently represent a hydrogen atom or a hydrocarbon group having 1 to 20 carbon atoms, and more preferably each independently represent a hydrogen atom.

In a case where q=0, $R^{10}$ and $R^{11}$, $R^{11}$ and $R^{12}$, $R^{12}$ and $R^{13}$, $R^{13}$ and $R^{14}$, $R^{14}$ and $R^{15}$, or $R^{15}$ and $R^{10}$ may form a monocyclic ring or a polycyclic ring by being bonded to each other. In a case where q=1 or 2, $R^{10}$ and $R^{11}$, $R^{11}$ and $R^{17}$, $R^{17}$ and $R^{17}$, $R^{17}$ and $R^{12}$, $R^{12}$ and $R^{13}$, $R^{13}$ and $R^{14}$, $R^{14}$ and $R^{15}$, $R^{15}$ and $R^{16}$, $R^{16}$ and $R^{16}$, or $R^{16}$ and $R^{10}$ may form a monocyclic ring or a polycyclic ring by being bonded to each other. The monocyclic ring or the polycyclic ring may have a double bond, and the monocyclic ring or the polycyclic ring may be an aromatic ring.

The Formula (C-1) is particularly preferably a compound represented by the following Formula (C-1A).

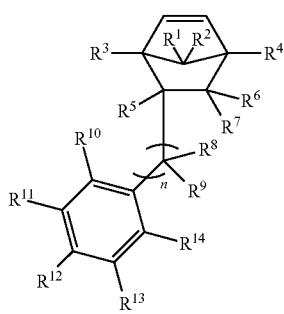

(C-1A)

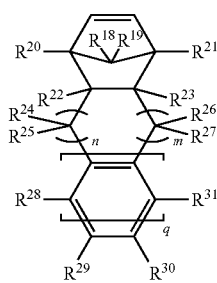

(C-2)

In Formula (C-2), n and m each independently represent 0, 1, or 2, q represents 1, 2, or 3. m preferably represents 0 or 1, and more preferably represents 1. n preferably represents 0 or 1, and more preferably represents 0. q preferably represents 1 or 2, and more preferably represents 1.

$R^{18}$ to $R^{31}$ each independently represent a hydrogen atom, a halogen atom except for a fluorine atom, or a hydrocarbon group having 1 to 20 carbon atoms that may be substituted with a halogen atom except for a fluorine atom.

$R^{18}$ to $R^{31}$ preferably each independently represent a hydrogen atom or a hydrocarbon group having 1 to 20 carbon atoms, and more preferably each independently represent a hydrogen atom.

In a case where q=1, $R^{28}$ and $R^{29}$, $R^{29}$ and $R^{30}$, or $R^{30}$ and $R^{31}$ may form a monocyclic ring or a polycyclic ring by being bonded to each other. In a case where q=2 or 3, $R^{28}$ and $R^{28}$, $R^{28}$ and $R^{29}$, $R^{29}$ and $R^{30}$, $R^{30}$ and $R^{31}$, or $R^{31}$ and $R^{31}$ may form a monocyclic ring or a polycyclic ring by being bonded to each other. The monocyclic ring or the polycyclic ring may have a double bond, and the monocyclic ring or the polycyclic ring may be an aromatic ring.

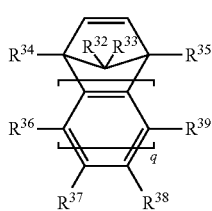

(C-3)

In Formula (C-3), q represents 1, 2, or 3. q preferably represents 1 or 2, and more preferably represents 1.

$R^{32}$ to $R^{39}$ each independently represent a hydrogen atom, a halogen atom except for a fluorine atom, or a hydrocarbon group having 1 to 20 carbon atoms that may be substituted with a halogen atom except for a fluorine atom.

$R^{32}$ to $R^{39}$ preferably each independently represent a hydrogen atom or a hydrocarbon group having 1 to 20 carbon atoms, and more preferably each independently represent a hydrogen atom.

In a case where q=1, $R^{36}$ and $R^{37}$, $R^{37}$ and $R^{38}$, or $R^{38}$ and $R^{39}$ may form a monocyclic ring or a polycyclic ring by being bonded to each other. In a case where q=2 or 3, $R^{36}$ and $R^{36}$, $R^{36}$ and $R^{37}$, $R^{37}$ and $R^{38}$, $R^{38}$ and $R^{39}$, or $R^{39}$ and $R^{39}$ may form a monocyclic ring or a polycyclic ring by being bonded to each other. The monocyclic ring or the polycyclic ring may have a double bond, and the monocyclic ring or the polycyclic ring may be an aromatic ring.

Examples of the hydrocarbon group having 1 to 20 carbon atoms include an alkyl group having 1 to 20 carbon atoms, a cycloalkyl group having 3 to 15 carbon atoms, an aromatic hydrocarbon group, and the like. More specifically, examples of the alkyl group include a methyl group, an ethyl group, a propyl group, an isopropyl group, an amyl group, a hexyl group, an octyl group, a decyl group, a dodecyl group, an octadecyl group, and the like. Examples of the cycloalkyl group include a cyclohexyl group and the like. Examples of the aromatic hydrocarbon group include an aryl group and an aralkyl group such as a phenyl group, a tolyl group, a naphthyl group, a benzyl group, and a phenyl ethyl group. These hydrocarbon groups may be substituted with a halogen atom except for a fluorine atom.

Among these, as the cyclic olefin having an aromatic ring according to the present embodiment, for example, at least one kind of cyclic olefin selected from benzonorbornadiene, indene norbornene, and methyl phenyl norbornene is preferable.

In a case where the total content of the constitutional unit (A), the constitutional unit (B), and the constitutional unit (C) in the cyclic olefin-based copolymer (P) according to the present embodiment is 100 mol %, the content of the constitutional unit (C) in the cyclic olefin-based copolymer (P) is preferably equal to or greater than 0.1 mol % to equal to or smaller than 50 mol %, more preferably equal to or greater than 1 mol %, and even more preferably equal to or greater than 3 mol %. Furthermore, the content of the constitutional unit (C) in the cyclic olefin-based copolymer (P) is more preferably equal to or smaller than 40 mol %, even more preferably equal to or smaller than 30 mol %, still more preferably equal to or smaller than 25 mol %, and particularly preferably equal to or smaller than 20 mol %.

In the present embodiment, the content of the constitutional unit (C) can be measured, for example, by $^1$H-NMR or $^{13}$C-NMR.

In a case where the total content of the constitutional unit (B) and the constitutional unit (C) in the cyclic olefin-based copolymer (P) according to the present embodiment is 100 mol %, the content of the constitutional unit (C) in the cyclic olefin-based copolymer (P) according to the present embodiment is preferably equal to or greater than 5 mol % and equal to or smaller than 95 mol %, more preferably equal to or greater than 5 mol % and equal to or smaller than 70 mol %, and even more preferably equal to or greater than 5 mol % and equal to or smaller than 50 mol %.

In the present embodiment, the content of the constitutional unit (B) and the constitutional unit (C) can be measured, for example, by $^1$H-NMR or $^{13}$C-NMR.

The copolymerization type of the cyclic olefin-based copolymer (P) according to the present embodiment is not particularly limited, and examples thereof include a random copolymer, a block copolymer, and the like. In the present embodiment, from the viewpoint of making it possible to obtain a medical container excellent in transparency and heat resistance, as the cyclic olefin-based copolymer (P) according to the present embodiment, a random copolymer is preferable.

The cyclic olefin-based copolymer (P) according to the present embodiment can be manufactured, for example, by appropriately selecting conditions according to the methods described in Japanese Unexamined Patent Publication No. 60-168708, Japanese Unexamined Patent Publication No. 61-120816, Japanese Unexamined Patent Publication No. 61-115912, Japanese Unexamined Patent Publication No. 61-115916, Japanese Unexamined Patent Publication No. 61-271308, Japanese Unexamined Patent Publication No. 61-272216, Japanese Unexamined Patent Publication No. 62-252406, Japanese Unexamined Patent Publication No. 62-252407, Japanese Unexamined Patent Publication No. 2007-314806, Japanese Unexamined Patent Publication No. 2010-241932, and the like.

From the viewpoint of further improving the heat resistance of the obtained medical container while excellently maintaining the transparency thereof, a glass transition temperature (Tg) of the cyclic olefin-based copolymer (P) according to the present embodiment measured using a differential scanning calorimeter (DSC) is preferably equal to or higher than 120° C. and equal to or lower than 180° C., more preferably equal to or higher than 125° C. and equal to or lower than 170° C., and even more preferably equal to or higher than 130° C. and equal to or lower than 165° C.

An intrinsic viscosity [η] (in decalin at 135° C.) of the cyclic olefin-based copolymer (P) according to the present embodiment is 0.05 to 5.0 dl/g for example. The intrinsic viscosity [η] is preferably 0.2 to 4.0 dl/g, more preferably 0.3 to 2.0 dl/g, and particularly preferably 0.4 to 1.0 dl/g.

In a case where the intrinsic viscosity [η] is equal to or higher than the lower limit described above, the mechanical strength of the medical container can be improved. In a case where the intrinsic viscosity [η] is equal to or lower than the upper limit described above, molding properties can be improved.

[Cyclic Olefin-Based Copolymer Composition]

The cyclic olefin-based copolymer composition according to the present embodiment is a cyclic olefin-based copolymer composition for forming a medical container, and contains the cyclic olefin-based copolymer (P) according to the present embodiment. If necessary, the composition may contain other components in addition to the cyclic olefin-based copolymer (P). In the present embodiment, in a case where the cyclic olefin-based copolymer composition according to the present embodiment contains only the cyclic olefin-based copolymer (P), the composition is also called cyclic olefin-based copolymer composition.

In a case where the total amount of the cyclic olefin-based copolymer composition is 100% by mass, from the viewpoint of further improving the balance among the performances such as transparency, γ-ray resistance, and electron beam resistance of the obtained medical container, the content of the cyclic olefin-based copolymer (P) in the cyclic olefin-based copolymer composition according to the present embodiment is preferably equal to or greater than 50% by mass and equal to or smaller than 100% by mass, more preferably equal to or greater than 70% by mass and equal to or smaller than 100% by mass, even more preferably equal to or greater than 80% by mass and equal to or smaller than 100% by mass, and particularly preferably equal to or greater than 90% by mass and equal to or smaller than 100% by mass.

In a case where the proportion of the cyclic olefin-based copolymer (P) contained in the cyclic olefin-based copolymer composition according to the present embodiment is as described above, the obtained medical container satisfies excellent transparency that is required to medical containers, and the γ-ray resistance or the electron beam resistance of the obtained medical container can be further improved.

(Other Components)

If necessary, a weatherproof stabilizer, a heat-resistant stabilizer, an antioxidant, a metal deactivator, a hydrochloric acid absorber, an antistatic agent, a flame retardant, a slip agent, an antiblocking agent, an antifogging agent, a lubricant, natural oil, synthetic oil, wax, an organic or inorganic filler, and the like can be mixed with the cyclic olefin-based copolymer composition according to the present embodiment to such a degree that does not impair the object of the present invention. The proportion of these components to be mixed may be appropriately set.

If necessary, the cyclic olefin-based copolymer composition according to the present embodiment may contain a hindered amine-based compound [D].

As the hindered amine-based compound [D] (hereinafter, simply described as compound [D] or [D]), it is possible to appropriately use a compound having one hindered amine structure (specifically, a partial structure represented by the following Formula (b1)) or two or more hindered amine structures.

In Formula (b1), * represents a bond with another chemical structure.

(b1)

Specifically, as the compound [D], it is possible to use compounds known as Hindered Amine Light Stabilizers (abbreviation: HALS) and the like.

Examples of the compound [D] include the hindered amine-based compound described in paragraphs "0058" to "0082" in International Publication No. WO2006/112434, the hindered amine-based compound described in paragraphs "0124" TO "0186" in International Publication No. WO2008/047468, the piperidine derivative or a salt thereof described in paragraphs "0187" to "0226" in International Publication No. WO2008/047468, the polyamine derivative or a salt thereof described in Japanese Unexamined Patent Publication No. 2006-321793, and the like.

Furthermore, it is possible to use commercial products such as Chimassorb 2020, Chimassorb 944, Tinuvin 622, Tinuvin PA144, Tinuvin 765, Tinuvin 770 (manufactured by BASF SE), Cyasorb UV-3853, Cyasorb uv-3529, Cyasorb UV-3346, Cyasorb UV-531 (manufactured by Cytec Technology Corp.), ADEKASTAB LA-52, ADEKASTAB LA-57, ADEKASTAB LA-63P, ADEKASTAB LA-68, ADEKASTAB LA-72, ADEKASTAB LA-77Y, ADEKASTAB LA-81, ADEKASTAB LA-82, and ADEKASTAB LA-87 (manufactured by ADEKA CORPORATION).

In the present embodiment, the compound [D] is preferably a compound having a structural unit represented by the following General Formula (b2).

Typically, this compound is a polymer or an oligomer. Presumably, in a case where the compound [D], which is a polymer or an oligomer just as the compound, is used, the compatibility with the cyclic olefin-based copolymer (P) may be improved, and a more uniform composition could be made. Furthermore, presumably, the compound [D] may hardly change to a structure having characteristic absorption even being subjected to irradiation. Presumably, as a result, the discoloration caused by the irradiation with electron beams or γ-rays could be further inhibited, and the generation of radicals by the irradiation with electron beams or γ-rays could be further suppressed.

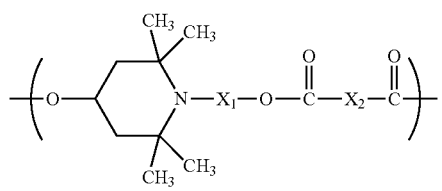

(b2)

In General Formula (b2), X1 and X2 each independently represent a divalent linking group.

Examples of the divalent linking group represented by X1 and X2 include an alkylene group, a cycloalkylene group, an arylene group, a group constituted with these groups linked to each other, and the like. Among these, an alkylene group is preferable, an alkylene group having 1 to 6 carbon atoms is more preferable, and an alkylene group having 1 to 4 carbon atoms is even more preferable.

As the compound having the structural unit represented by General Formula (b2), commercial products may also be used. Alternatively, the compound may be obtained by performing polycondensation of corresponding diol and carboxylic acid.

One kind of compound [D] may be used singly, or two or more kinds of compounds [D] may be used.

In a case where the content of the cyclic olefin-based copolymer (P) is 100 parts by mass, the content of the compound [D] in the composition is 0.01 to 2.0 parts by mass for example. The content of the compound [D] is preferably 0.05 to 1.5 parts by mass, and more preferably 0.10 to 1.0 part by mass. In a case where the content of the compound [D] is within the above range, it is possible to effectively suppress the discoloration caused by the irradiation with electron beams or γ-rays, the generation of radicals, and the like while maintaining other performances (for example, molding properties, mechanical strength, and the like).

If necessary, the cyclic olefin-based copolymer composition according to the present embodiment may contain a phosphorus-based compound [E].

There is no particular limitation on the usable phosphorus-based compound [E] (hereinafter, simply described as compound [E] or [E]). For example, as the compound [E], known phosphorus-based antioxidants can be used.

As the phosphorus-based antioxidants, conventionally known phosphorus-based antioxidants (for example, a phosphite-based antioxidant) can be used without particular limitation.

Specifically, examples thereof include a monophosphite-based compound such as triphenyl phosphite, diphenyl isodecyl phosphite, phenyl diisodecyl phosphite, tris(nonylphenyl)phosphite, tris(dinonylphenyl)phosphite, tris(2,4-di-t-butylphenyl)phosphite, tris(2-t-butyl-4-methylphenyl) phosphite, tris(cyclohexylphenyl)phosphite, 2,2-methylenebis(4,6-di-t-butylphenyl)octylphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, or 10-decyloxy-9,10-dihydro-9-oxa-10-phosphaphenanthrene; a diphosphite-based compound such as 4,4'-butylidene-bis(3-methyl-6-t-butylphenyl-di-tridecylphosphite), 4,4'-isopropylidene-bis (phenyl-di-alkyl(C12 to C15)phosphite), 4,4'-isopropylidene-bis(diphenylmonoalkyl(C12 to C15) phosphite), 1,1,3-tris(2-methyl-4-di-tridecylphosphite-5-t-butylphenyl)butane, tetrakis(2,4-di-t-butylphenyl)-4,4'-biphenylene diphosphite, cyclic neopentane tetrayl bis (isodecylphosphite), cyclic neopentane tetrayl bis (nonylphenylphosphite), cyclic neopentane tetrayl bis(2,4-di-t-butylphenylphosphite), cyclic neopentane tetrayl bis(2,4-dimethylphenylphosphite), or cyclic neopentane tetrayl bis(2,6-di-t-butylphenylphosphite); and the like.

As the compound [E], a tetravalent organic phosphorus compound is preferably used. More specifically, the compound [E] is a compound having a structure established in a case where three hydrogen atoms in phosphorous acid $(P(OH)_3)$ are substituted with the same organic group or different organic groups.

More specifically, as the compound [E], a compound represented by the following General Formula (c1), (c2), or (c3) is preferable.

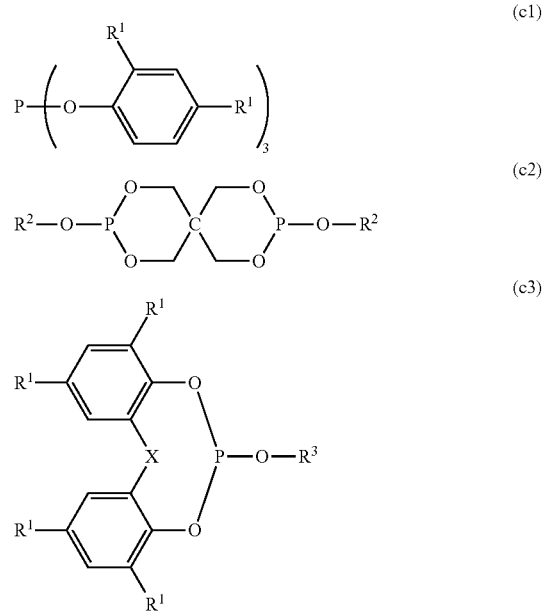

In General Formulae (c1), (c2), and (c3), in a case where there is a plurality of $R^1$'s, $R^1$'s each independently represent an alkyl group; in a case where there is a plurality of $R^2$'s, $R^2$'s each independently represent an aromatic group; $R^3$ represents an alkyl group, a cycloalkyl group, an aryl group, or an aralkyl group; and X represents a single bond or a divalent linking group.

The alkyl group represented by $R^1$ preferably has 1 to 10 carbon atoms. The alkyl group is more preferably a t-butyl group.

Examples of the aromatic group represented by $R^2$ include a phenyl group, a naphthyl group, a group obtained by substituting these groups with an alkyl group, and the like.

The number of carbon atoms in $R^3$ is preferably 1 to 30, more preferably 3 to 20, and even more preferably 6 to 18.

$R^3$ is preferably an aryl group or an aralkyl group, and more preferably an aralkyl group. The aryl group or the aralkyl group may be further substituted with a substituent (for example, an alkyl group having 1 to 6 carbon atoms, a hydroxy group, or the like).

In a case where X represents a divalent linking group, specific examples thereof include an alkylene group (a methylene group or the like), an ether group (—O—), and the like. X is preferably a single bond.

One kind of compound [E] may be used singly, or two or more kinds of compounds [E] may be used.

In a case where the amount of the cyclic olefin-based copolymer (P) is 100 parts by mass, the content of the compound [E] in the composition is 0.01 to 1.5 parts by mass for example. The content of the compound [E] is preferably 0.02 to 1.0 part by mass, and more preferably 0.05 to 0.5 parts by mass. In a case where the content of the compound [E] is within the above range, it is possible to effectively suppress the discoloration caused by the irradiation with electron beams or γ-rays, the generation of radicals, and the like while maintaining other performances (for example, molding properties, mechanical strength, and the like).

Furthermore, in another aspect, in a case where the amount of the cyclic olefin-based copolymer (P) is 100 parts by mass, the content of the phosphorus-based compound [E] is preferably less than 0.05 parts by mass, more preferably equal to or smaller than 0.03 parts by mass, and even more preferably equal to or smaller than 0.02 parts by mass.

The cyclic olefin-based copolymer composition according to the present embodiment can be obtained by methods such as a method of melting and kneading the cyclic olefin-based copolymer (P) and other components by using an extruder and a known kneading device such as the Banbury mixer; a method of dissolving the cyclic olefin-based copolymer (P) and other components in the same solvent and then evaporating the solvent; and a method of adding the cyclic olefin-based copolymer (P) and other components to a poor solvent such that precipitation occurs.

[Medical Container]

Next, the medical container of an embodiment according to the present invention will be described.

The medical container according to the present embodiment contains the cyclic olefin-based copolymer (P) or the cyclic olefin-based copolymer composition according to the present embodiment.

The medical container according to the present embodiment contains the cyclic olefin-based copolymer (P). Therefore, in the medical container, the balance between the performances such as transparency and γ-ray resistance or electron beam resistance is excellent. This medical container is hardly discolored even though being irradiated with electron beams or γ-rays.

According to another examination conducted by the inventors of the present invention, it has been revealed that sometimes the conventional medical containers generate radicals by electron beam irradiation or γ-ray irradiation. It is apprehended that the medical containers may have a risk of degenerating contents after being filled with the contents.

In contrast, the medical container according to the present embodiment can reduce the amount of radicals generated by electron beam irradiation or γ-ray irradiation. Therefore, in a case where the medical container according to the present embodiment is used, the risk of degenerating the contents can be reduced.

From the viewpoint of further improving the balance between the performances such as radiation resistance and transparency, in a case where the total amount of the medical container is 100% by mass, the content of the cyclic olefin-based copolymer (P) in the medical container according to the present embodiment is preferably equal to or greater than 50% by mass and equal to or smaller than 100% by mass, more preferably equal to or greater than 70% by mass and equal to or smaller than 100% by mass, even more preferably equal to or greater than 80% by mass and equal to or smaller than 100% by mass, and particularly preferably equal to or greater than 90% by mass and equal to or smaller than 100% by mass.

As the method for obtaining the medical container by molding the cyclic olefin-based copolymer (P) according to the present embodiment or the cyclic olefin-based copolymer composition according to the present embodiment, known methods can be used without particular limitation. Although the method varies with the use and the shape of the medical container, for example, it is possible to use extrusion molding, injection molding, inflation molding, blow molding, extrusion blow molding, injection blow molding, press molding, vacuum molding, powder slush molding, calendar molding, expansion molding, and the like. Among these, from the viewpoint of molding properties and productivity, an injection molding method is preferable. The molding conditions are appropriately selected according to the purpose of use and the molding method. For example, for injection molding, generally, the temperature of a resin is appropriately selected within a range of 150° C. to 400° C., preferably within a range of 200° C. to 350° C., and more preferably within a range of 230° C. to 330° C.

Furthermore, for example, by irradiating the medical container manufactured as above with γ-rays or electron beams, it is possible to obtain a container prepared by irradiating the medical container with γ-rays or electron beams (medical container irradiated with γ-rays or electron beams). Such a medical container is clean because it has been sterilized by the irradiation. Furthermore, in the medical container, the occurrence of discoloration or radicals is inhibited. The radiation dose is not particularly limited, but is 5 to 100 kilogray (kGy) in general, and preferably 10 to 80 kilogray.

Examples of the medical container include an outer cylinder of an injector (hereinafter, referred to as syringe), a syringe used in a cylinder filled with a liquid medicine or a medication (hereinafter, referred to as prefilled syringe as well), a storage container used by being filled with a liquid medicine or a medication (hereinafter, referred to as liquid medicine storage container as well), and the like.

The prefilled syringe is a preparation in the form of a syringe that has been filled with a liquid medicine or a medication, and includes a single chamber type filled with one kind of liquid and a double chamber type filled with two kinds of medications. Most of the prefilled syringes are the single chamber type. The double chamber type includes a liquid powder-type preparation consisting of powder and a liquid for dissolving the powder, and a liquid liquid-type preparation consisting of two kinds of liquids. Examples of liquids contained in the single chamber type include a heparin solution and the like. Examples of syringes used in the syringe and the prefilled syringe include a prefillable syringe, a prefilled syringe for vaccines, a prefilled syringe for anticancer drugs, a needleless syringe, and the like.

Examples of the liquid medicine storage container include a wide mouth bottle, a narrow mouth bottle, a medicine bottle, a vial, an infusion bottle, a bulk container, a petri dish, a test tube, an analytical cell, and the like. More specifically, examples thereof include a container for liquid, powder, and solid chemicals such as an ample, a press through package, an infusion bag, a container for medicinal drops, or a container for eye drops; a sample container such as a test tube for sampling for blood test, a blood collection tube, or a specimen container; an analytical container such as an ultraviolet test cell; a sterilized container of medical instruments such as a scalpel, forceps, gauze, and a contact lens; a medical instrument such as a disposable syringe or prefilled syringe; laboratory equipment such as a beaker, a vial, an ample, or a test tube flask; a housing of artificial organs, and the like.

The medical container according to the present embodiment has excellent transparency. The transparency is evaluated based on inner haze.

It is preferable that the medical container has an excellent light transmittance. The light transmittance is determined as a spectral transmittance or a total light transmittance according to the use.

In a case where the medical container is assumed to be used in wavelength bands of all types of light or in a plurality of wavelength bands, the medical container needs to have an excellent total light transmittance. The total light transmittance of the medical container whose surface is not provided with an antireflection film is equal to or higher than 85%, and preferably 88% to 93%. As long as the total light transmittance is equal to or higher than 85%, the medical container can secure the required quantity of light. The total light transmittance can be measured by known methods, and the measurement device and the like are not limited. Examples of the methods include a method of molding the cyclic olefin-based copolymer composition according to the present embodiment into a sheet having a thickness of 3 mm based on ASTM D1003, and measuring the total light transmittance of the sheet obtained by molding the cyclic olefin-based copolymer composition according to the present embodiment by using a haze meter, and the like.

The medical container according to the present embodiment has an excellent light transmittance for light having a wavelength of 450 nm to 800 nm.

In a case where a known antireflection film is provided on the surface of the medical container, the light transmittance can be further improved.

Hitherto, the embodiment of the second invention has been described. However, the embodiment is merely an example of the second invention, and various constitutions other than the embodiment can also be adopted.

Furthermore, the second invention is not limited to the embodiment, and as long as the object of the second invention can be achieved, modification, amelioration, and the like are also included in the second invention.

Hitherto, the embodiments of the inventions of the present application have been described. However, the embodiments are merely examples of the present inventions, and various constitutions other than the embodiments can also be adopted.

Furthermore, the present inventions are not limited to the embodiments, and as long as the objects of the present inventions can be achieved, modification, amelioration, and the like are also included in the inventions.

It goes without saying that the inventions of the present application can be combined as long as what are included in the inventions do not conflict with each other.

EXAMPLES AND COMPARATIVE EXAMPLES ACCORDING TO FIRST INVENTION

Hereinafter, the first invention of the present application will be specifically described based on examples. However, the first invention of the present application is not limited to the examples.

<Manufacturing of Cyclic Olefin-Based Copolymer>

Manufacturing Example 1

As an inert gas, nitrogen was allowed to flow in a reaction container, which included a stirring device, had a volume of 500 ml, and was made of glass, for 30 minutes at a flow rate of 100 Nl/hr. Then, cyclohexane, tetracyclo[4.4.0.1$^{2,5}$.1$^{7,10}$]-3-dodecene (40 mmol, hereinafter, referred to as tetracyclododecene as well) and benzonorbornadiene (88 mmol, hereinafter, referred to as BNBD as well) were added to the container. Thereafter, the polymerization solvent was stirred at a rotation speed of 600 rpm, and in this state, the solvent temperature was increased to 50° C. After the solvent temperature reached a predetermined temperature, the gas flowing in the reaction container was changed to ethylene from nitrogen. Ethylene and hydrogen were allowed to flow in the reaction container at supply rates of 50 Nl/hr and 2.0 Nl/hr respectively. After 10 minutes, PMAO (1.8 mmol) and the catalyst (0.0030 mmol) prepared by the method described in paragraph "0112" in Japanese Unexamined Patent Publication No. 2010-241932 were added to the reaction container made of glass such that polymerization was initiated.

After 10 minutes, 5 ml of isobutyl alcohol was added thereto so as to stop the polymerization, thereby obtaining a polymerized solution containing a copolymer of ethylene, tetracyclododecene, and BNBD. Subsequently, the polymerized solution was moved to a beaker having a volume of 2 L that was additionally prepared, 5 ml of concentrated hydrochloric acid and a stirrer were added thereto, and a deliming operation was performed by bringing the copolymer into contact with the hydrochloric acid for 2 hours in a state of strongly stirring the solution. Ina state of being stirred, the polymerized solution having undergone deliming was added to a beaker containing acetone that was about three times the volume of the polymerized solution, such that the copolymer was precipitated. The precipitated copolymer was separated from the filtrate by filtration. The obtained polymer containing the solvent was dried under reduced pressure for 10 hours at 130° C., thereby obtaining 4.58 g of a white powder-like ethylene·tetracyclododecene·BNBD copolymer.

In this way, a cyclic olefin-based copolymer (P-1) was obtained.

Manufacturing Examples 2 to 12

Cyclic olefin-based copolymers (P-2) to (P-11) described in Table 1 were obtained by performing the same operation as that in Manufacturing Example 1, except that the content of each of the constitutional units constituting the cyclic olefin-based copolymers was adjusted to the value described in Table 1.

Furthermore, a cyclic olefin-based copolymer (P-12) was prepared by mixing the cyclic olefin-based copolymer (P-10) with the cyclic olefin-based copolymer (P-11) at a mass ratio of 1:1 (Manufacturing Example 12).

In Table 1, BNBD means benzonorbornadiene represented by the following Formula (1), and IndNB means indene norbornene represented by the following Formula (2). MePhNB means methyl phenyl norbornene represented by the following Formula (3).

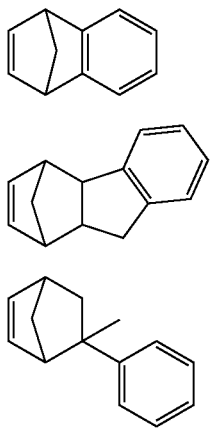

(1)
(2)
(3)

Examples 1 to 9 and Comparative Examples 1 and 2

In each of the examples and the comparative examples, various physical properties were measured or evaluated by the following method. The obtained results are shown in Table 2.

[Method for Measuring Content of Each of Constitutional Units Constituting Cyclic Olefin-Based Copolymer]

The content of ethylene, tetracyclo[$4.4.0.1^{2,5}.1^{7,10}$]-3-dodecene, and the cyclic olefin having an aromatic ring was measured under the following conditions by using a nuclear magnetic resonance spectrometer "ECA 500" manufactured by JEOL Ltd.

Solvent: deuterated tetrachloroethane
Sample concentration: 50 to 100 g/l-solvent
Pulse repetition time: 5.5 seconds
Number of times of integration: 6,000 to 16,000
Measurement temperature: 120° C.

From a $^{13}$C-NMR spectrum measured under the above conditions, the composition of each of the ethylene, the tetracyclododecene, and the cyclic olefin having an aromatic ring was quantified.

[Glass Transition Temperature Tg (° C.)]

By using DSC-6220 manufactured by Shimadzu Corporation, a glass transition temperature Tg of the cyclic olefin-

TABLE 1

| Cyclic olefin-based copolymer | | P-1 | P-2 | P-3 | P-4 | P-5 | P-6 | P-7 | P-8 | P-9 | P-10 | P-11 |
|---|---|---|---|---|---|---|---|---|---|---|---|---|
| Cyclic olefin having aromatic ring from which constitutional unit (C) is derived | | BNBD | BNBD | BNBD | IndNB | IndNB | IndNB | MePhNB | MePhNB | MePhNB | N/A | BNBD |
| Composition | Constitutional unit (A) (derived from ethylene) (mol %) | 63.0 | 64.1 | 61.0 | 64.4 | 63.3 | 66.4 | 63.4 | 60.0 | 55.1 | 65.0 | 62.0 |
| | Constitutional unit (B) (derived from tetracyclododecene) (mol %) | 21.0 | 28.1 | 8.0 | 25.3 | 21.3 | 11.5 | 26.7 | 20.0 | 10.4 | 35.0 | 0.0 |
| | Constitutional unit (C) (mol %) | 16.0 | 7.8 | 31.0 | 10.3 | 15.4 | 22.1 | 9.9 | 20.0 | 34.5 | 0.0 | 38.0 |

TABLE 2

| | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| Cyclic olefin-based copolymer | | P-1 | P-2 | P-3 | P-4 | P-5 | P-6 | P-7 | P-8 | P-9 | P-10 | P-12 |
| Cyclic olefin having aromatic ring from which constitutional unit (C) is derived | | BNBD | BNBD | BNBD | IndNB | IndNB | IndNB | MePhNB | MePhNB | MePhNB | N/A | |
| Composition | Constitutional unit (A) (derived from ethylene) (mol %) | 63.0 | 64.1 | 61.0 | 64.4 | 63.3 | 66.4 | 63.4 | 60.0 | 55.1 | 65.0 | |
| | Constitutional unit (B) (derived from tetracyclododecene) (mol %) | 21.0 | 28.1 | 8.0 | 25.3 | 21.3 | 11.5 | 26.7 | 20.0 | 10.4 | 35.0 | |
| | Constitutional unit (C) (mol %) | 16.0 | 7.8 | 31.0 | 10.3 | 15.4 | 22.1 | 9.9 | 20.0 | 34.5 | 0.0 | |
| Tg (° C.) | | 147 | 140 | 148 | 152 | 154 | 143 | 143 | 152 | 165 | 150 | 130, 150 |
| [η] (dl/g) | | 0.47 | 0.45 | 0.78 | 0.50 | 0.44 | 0.41 | 0.45 | 0.45 | 0.45 | 0.45 | 0.51 |
| Refractive index (nd) | | 1.56 | 1.55 | 1.57 | 1.55 | 1.56 | 1.56 | 1.55 | 1.55 | 1.56 | 1.54 | — |
| Abbe number | | 46 | 51 | 39 | 49 | 47 | 43 | 51 | 47 | 43 | 56 | — |
| Inner haze | | ○ | ○ | ○ | ○ | ○ | ○ | ○ | ○ | ○ | ○ | X |
| Birefringence | | B | A | B | A | B | B | A | B | B | A | — | based copolymer was measured in a nitrogen (N2) atmosphere. The cyclic olefin-based copolymer was heated to 200° C. from room temperature at a heating rate of 10° C./min and then kept as it was for 5 minutes. Thereafter, the copolymer was cooled to −20° C. at a cooling rate of 10° C./min and then kept as it was for 5 minutes. From a heat absorption curve formed at the time of heating the copolymer to 200° C. at a heating rate of 10° C./min, the glass transition temperature (Tg) of the cyclic olefin-based copolymer was determined.

[Intrinsic Viscosity [η]]

By using a mobile viscometer (manufactured by RIGO-SHA & Co., Ltd., type: VNR053U), 0.25 to 0.30 g of the cyclic olefin-based copolymer was dissolved in 25 ml of decalin, thereby obtaining a sample. Based on ASTM J1601, the specific viscosity of the cyclic olefin-based copolymer was measured at 135° C., a ratio between the specific viscosity and the concentration was extrapolated to 0, thereby determining an intrinsic viscosity [η] of the cyclic olefin-based copolymer.

[Formation of Micro-Compounder]

By using a compact kneader manufactured by Xplore Instruments BV, the cyclic olefin-based copolymers of Manufacturing Examples 1 to 10 and 12 were kneaded for 5 minutes at a kneading temperature of 280° C. and 50 rpm. Then, by using an injection molding machine manufactured by Xplore Instruments BV, the copolymers were subjected to injection molding under the conditions of a cylinder temperature of 280° C., an injection pressure of 12 to 15 bar, and a mold temperature of 135° C., thereby preparing injection molding sheets having a thickness of 1.0 mm.

[Inner Haze]

Based on JIS K7136, the inner haze of each of the 30 mm×30 mm×1.0 mm (thickness) injection molding sheets formed using the micro-compounder was measured by using benzyl alcohol. Then, the inner haze was evaluated based on the following standards.

O: less than 5%

X: equal to or higher than 5%.

[Birefringence]

For each of the 30 mm×30 mm×1.0 mm (thickness) injection molding sheets formed using the micro-compounder, by using KOBRA CCD manufactured by Oji Scientific Instruments, an average of phase differences of 20 to 35 mm from a gate direction at a measurement wavelength of 650 nm was determined.

Then, the birefringence was evaluated based on the following standards.

A: the average of phase differences was less than 30 nm.

B: the average of phase differences was equal to or greater than 30 nm and less than 40 nm.

C: the average of phase differences was equal to or greater than 40 nm.

[Refractive Index]

By using a refractometer (KPR200 manufactured by Shimadzu Corporation), for each of the 30 mm×30 mm×1.0 mm (thickness) injection molding sheets formed using the micro-compounder, a refractive index (nd) at a wavelength of 589 nm was measured based on ASTM D542.

[Abbe Number (ν)]

For each of the 30 mm×30 mm×1.0 mm (thickness) injection molding sheets formed using the micro-compounder, the refractive index was measured using the Abbe refractometer at wavelengths of 486 nm, 589 nm, and 656 nm at 23° C. Furthermore, by using the following equation, an Abbe number (ν) was calculated.

$$\nu = (nD-1)/(nF-nC)$$

nD: refractive index at wavelength of 589 nm nC: refractive index at wavelength of 656 nm nF: refractive index at wavelength of 486 nm Example 10

As a hydrophilic stabilizer, a triglycerin fatty acid ester (triglycerin oleate as an ester of triglycerin and oleaic acid (a mixture of a monoester, a diester, and a triester, proportion of ester: 41% for the monoester, 49% for the diester, and 10% for the triester)) was heated for 4 hours at 100° C. such that the stabilizer was melted. The molten stabilizer was directly put into an extruder in an amount of 0.6 parts by mass with respect to 100 parts by mass of the cyclic olefin-based copolymer (P-1), thereby obtaining a resin composition containing the cyclic olefin-based copolymer (P-1) and a distillate of an ester of triglycerin and oleaic acid.

Specifically, the cyclic olefin-based copolymer (P-1) was put into a twin screw extruder, which had screws rotating in the same direction and each having a diameter of 12 amp and had a vent hole at a position of L/D=34 from a resin injection portion, from the resin injection portion. Thereafter, the triglycerin fatty acid ester heated and melted at a temperature of 80° C. to 120° C. was put into the extruder from the vent hole, and melted and kneaded under the conditions of a screw rotation speed of 150 rpm and motor power of 2.2 kW, thereby obtaining a resin composition.

For the obtained resin composition, the glass transition temperature and the intrinsic viscosity [η] were measured by the same method as that in Example 1. The results are shown in Table 3.

Example 11

A resin composition was prepared in the same manner as in Example 10, except that triglycerin fatty acid ester was used in an amount of 0.8 parts by mass with respect to 100 parts by mass of the cyclic olefin-based copolymer (P-1) s described in Table 3.

For the obtained resin composition, the glass transition temperature and the intrinsic viscosity [η] were measured by the same method as that in Example 1. The results are shown in Table 3.

Example 12

A resin composition was prepared in the same manner as in Example 10, except that triglycerin fatty acid ester was used in an amount of 1.0 parts by mass with respect to 100 parts by mass of the cyclic olefin-based copolymer (P-1) as described in Table 3.

For the obtained resin composition, the glass transition temperature and the intrinsic viscosity [η] were measured by the same method as that in Example 1. The results are shown in Table 3.

Example 13

A resin composition was prepared in the same manner as in Example 10, except that as a hydrophilic stabilizer, instead of the triglycerin fatty acid ester, RIKEMAL DO-100 (manufactured by RIKEN VITAMIN Co., Ltd., containing diglycerin monooleate as a main component) was used in an amount of 0.6 parts by mass with respect to 100 parts by mass of the cyclic olefin-based copolymer (P-1) as described in Table 3.

Example 14

A resin composition was prepared in the same manner as in Example 10, except that as a hydrophilic stabilizer, instead of the triglycerin fatty acid ester, RIKEMAL DO-100 was used in an amount of 1.0 part by mass with respect to 100 parts by mass of the cyclic olefin-based copolymer (P-1) as described in Table 3.

For the obtained resin composition, the glass transition temperature and the intrinsic viscosity [η] were measured by the same method as that in Example 1. The results are shown in Table 3.

Example 15

A resin composition was prepared in the same manner as in Example 10, except that as a hydrophilic stabilizer, instead of the triglycerin fatty acid ester, EXCEPARL PE-MS (manufactured by Kao Corporation, containing pentaerythritol monostearate as a main component) was used in an amount of 1.8 parts by mass with respect to 100 parts by mass of the cyclic olefin-based copolymer (P-1) as described in Table 3.

For the obtained resin composition, the glass transition temperature and the intrinsic viscosity [η] were measured by the same method as that in Example 1. The results are shown in Table 3.

Example 16

A resin composition was prepared in the same manner as in Example 10, except that as a hydrophilic stabilizer, instead of the triglycerin fatty acid ester, EXCEPARL PE-MS was used in an amount of 2.4 parts by mass with respect to 100 parts by mass of the cyclic olefin-based copolymer (P-1) as described in Table 3.

For the obtained resin composition, the glass transition temperature and the intrinsic viscosity [η] were measured by the same method as that in Example 1. The results are shown in Table 3.

Example 17

A resin composition was prepared in the same manner as in Example 10, except that instead of the cyclic olefin-based copolymer (P-1), the cyclic olefin-based copolymer (P-5) was used as described in Table 3.

For the obtained resin composition, the glass transition temperature and the intrinsic viscosity [η] were measured by the same method as that in Example 1. The results are shown in Table 3.

Example 18

A resin composition was prepared in the same manner as in Example 12, except that instead of the cyclic olefin-based copolymer (P-1), the cyclic olefin-based copolymer (P-5) was used as described in Table 3.

For the obtained resin composition, the glass transition temperature and the intrinsic viscosity [η] were measured by the same method as that in Example 1. The results are shown in Table 3.

Example 19

A resin composition was prepared in the same manner as in Example 10, except that instead of the cyclic olefin-based copolymer (P-1), the cyclic olefin-based copolymer (P-8) was used as described in Table 3.

For the obtained resin composition, the glass transition temperature and the intrinsic viscosity [η] were measured by the same method as that in Example 1. The results are shown in Table 3.

Example 20

A resin composition was prepared in the same manner as in Example 12, except that instead of the cyclic olefin-based copolymer (P-1), the cyclic olefin-based copolymer (P-8) was used as described in Table 3.

For the obtained resin composition, the glass transition temperature and the intrinsic viscosity [η] were measured by the same method as that in Example 1. The results are shown in Table 3.

Evaluation Methods for Examples 1, 5, 8, and 10 to 20 in Table 3

(Method for Manufacturing Molded Article)

By using an injection molding machine (Micro-2 manufactured by MEIHO CO., LTD.), the resin composition was subjected to injection molding at a cylinder temperature of 320° C., thereby preparing 25 mm×25 mm×2 mmt (thickness) molded articles (test pieces). The mold temperature was set to be 135° C.

[Refractive Index and Abbe Number]

By using a refractometer (KPR3000 manufactured by Shimadzu Corporation), for each of the 25 mm×25 mm×2 mmt (thickness) molded test pieces, a refractive index (nd) at wavelengths of 486 nm, 589 nm, and 656 nm was measured based on ASTM D542. Furthermore, by using the following equation, an Abbe number (ν) was calculated. The results are shown in Table 2.

$$\nu = (nD-1)/(nF-nC)$$

nD: refractive index at wavelength of 589 nm
nC: refractive index at wavelength of 656 nm
nF: refractive index at wavelength of 486 nm

[Inner Haze]

Based on JIS K-7136, the inner haze of each of the molded articles was measured by using benzyl alcohol. Then, the inner haze was evaluated based on the following standards. The results are shown in Table 2.

O: less than 5%
X: equal to or higher than 5%.

[Birefringence]

For each of the molded 25 mm×25 mm×2 mmt (thickness) test pieces, by using KOBRA CCD manufactured by Oji Scientific Instruments, an average of phase differences of 20 to 35 mm from a gate direction at a measurement wavelength of 650 nm was determined. The results are shown in Table 2.

Then, the birefringence was evaluated based on the following standards.

A: the average of phase difference was less than 10 nm.
B: the average of phase difference was equal to or greater than 10 nm and less than 20 nm.
C: the average of phase difference was equal to or greater than 20 nm.

[Appearance After Environmental Testing]

The molded 25 mm×25 mm×2 mmt (thickness) test pieces were left to stand for 48 hours in an atmosphere of a temperature of 85° C. and a relative humidity of 85%. Thereafter, the test pieces were taken out and then left to stand for 48 hours in an atmosphere with a temperature of 23° C. and a relative humidity of 50%, and then haze thereof was measured. The results are shown in Table 2.

The change (hereinafter, described as Δ haze), which was obtained by subtracting the haze before the environmental testing from the haze after the environmental testing, was evaluated based on the following standards.

A: less than 5%

B: equal to or higher than 5%

TABLE 3

|  |  | Example 1 | Example 10 | Example 11 | Example 12 | Example 13 | Example 14 | Example 15 |
|---|---|---|---|---|---|---|---|---|
| Cyclic olefin-based copolymer | | P-1 | P-1 | P-1 | P-1 | P-1 | P-1 | P-1 |
| Cyclic olefin having aromatic ring from which constitutional unit (C) is derived | | BNBD | BNBD | BNBD | BNBD | BNBD | BNBD | BNBD |
| Composition | Constitutional unit (A) (derived from ethylene) (mol %) | 63.0 | 63.0 | 63.0 | 63.0 | 63.0 | 63.0 | 63.0 |
| | Constitutional unit (B) (derived from tetracyclododecene) (mol %) | 21.0 | 21.0 | 21.0 | 21.0 | 21.0 | 21.0 | 21.0 |
| | Constitutional unit (C) (mol %) | 16.0 | 16.0 | 16.0 | 16.0 | 16.0 | 16.0 | 16.0 |
| Triglycerin fatty acid ester (part by mass) | | 0.0 | 0.6 | 0.8 | 1.0 | 0.0 | 0.0 | 0.0 |
| RIKEMAL DO-100 (part by mass) | | 0.0 | 0.0 | 0.0 | 0.0 | 0.6 | 1.0 | 0.0 |
| EXCEPARL PE-MS (part by mass) | | 0.0 | 0.0 | 0.0 | 0.0 | 0.0 | 0.0 | 1.8 |
| Tg (° C.) | | 147 | 144 | 142 | 140 | 144 | 140 | 134 |
| [η] (dl/g) | | 0.47 | 0.47 | 0.47 | 0.47 | 0.47 | 0.47 | 0.47 |
| Refractive index (nd) | | 1.56 | 1.56 | 1.56 | 1.56 | 1.56 | 1.56 | 1.56 |
| Abbe number | | 46 | 46 | 46 | 46 | 46 | 46 | 46 |
| Inner haze | | ○ | ○ | ○ | ○ | ○ | ○ | ○ |
| Birefringence | | B | B | B | B | B | B | B |
| Appearance after environmental testing | | B | A | A | A | A | A | A |

|  |  | Example 16 | Example 5 | Example 17 | Example 18 | Example 8 | Example 19 | Example 20 |
|---|---|---|---|---|---|---|---|---|
| Cyclic olefin-based copolymer | | P-1 | P-5 | P-5 | P-5 | P-8 | P-8 | P-8 |
| Cyclic olefin having aromatic ring from which constitutional unit (C) is derived | | BNBD | IndNB | IndNB | IndNB | MePhNB | MePhNB | MePhNB |
| Composition | Constitutional unit (A) (derived from ethylene) (mol %) | 63.0 | 63.3 | 63.3 | 63.3 | 60.0 | 60.0 | 60.0 |
| | Constitutional unit (B) (derived from tetracyclododecene) (mol %) | 21.0 | 21.3 | 21.3 | 21.3 | 20.0 | 20.0 | 20.0 |
| | Constitutional unit (C) (mol %) | 16.0 | 15.4 | 15.4 | 15.4 | 20.0 | 20.0 | 20.0 |
| Triglycerin fatty acid ester (part by mass) | | 0.0 | 0.0 | 0.6 | 1.0 | 0.0 | 0.6 | 1.0 |
| RIKEMAL DO-100 (part by mass) | | 0.0 | 0.0 | 0.0 | 0.0 | 0.0 | 0.0 | 0.0 |
| EXCEPARL PE-MS (part by mass) | | 2.4 | 0.0 | 0.0 | 0.0 | 0.0 | 0.0 | 0.0 |
| Tg (° C.) | | 130 | 154 | 151 | 147 | 152 | 149 | 145 |
| [η] (dl/g) | | 0.47 | 0.44 | 0.44 | 0.44 | 0.45 | 0.45 | 0.45 |
| Refractive index (nd) | | 1.56 | 1.56 | 1.56 | 1.56 | 1.55 | 1.55 | 1.55 |
| Abbe number | | 46 | 47 | 47 | 47 | 47 | 47 | 47 |
| Inner haze | | ○ | ○ | ○ | ○ | ○ | ○ | ○ |
| Birefringence | | B | B | B | B | B | B | B |
| Appearance after environmental testing | | A | B | A | A | B | A | A |

As shown in the above tables, the optical lenses obtained in the examples had a high refractive index and an Abbe number which was lower than the Abbe number of the optical lens obtained in Comparative Example 1. That is, the optical lenses obtained in the examples satisfied various characteristics required to optical lenses and had a high refractive index and a low Abbe number. In contrast, the optical lens of Comparative Example 1, in which the cyclic olefin-based copolymer that did not contain the constitutional unit (C) derived from the cyclic olefin having an aromatic ring was used, had a high Abbe number. In Comparative Example 1, the intended optical lens was not obtained. The optical lens of Comparative Example 2 had poor inner haze and poor optical characteristics.

EXAMPLES AND COMPARATIVE EXAMPLES ACCORDING TO SECOND INVENTION

Hereinafter, the second invention of the present application will be specifically described based on examples. However, the second invention of the present application is not limited to the examples.

<Manufacturing of Cyclic Olefin-Based Copolymer>

Manufacturing Example 13

As an inert gas, nitrogen was allowed to flow in a reaction container, which included a stirring device, had a volume of 500 ml, and was made of glass, for 30 minutes at a flow rate of 100 Nl/hr. Then, cyclohexane, tetracyclo[$4.4.0.1^{2,5}.1^{7,10}$]-3-dodecene (19 mmol, hereinafter, referred to as tetracyclododecene as well) and indene norbornene (8.0 mmol, hereinafter, referred to as IndNB as well) were added to the reaction container. Thereafter, the polymerization solvent was stirred at a rotation speed of 600 rpm, and in this state, the solvent temperature was increased to 50° C. After the solvent temperature reached a predetermined temperature, the gas flowing in the reaction container was changed to ethylene from nitrogen. Ethylene and hydrogen were allowed to flow in the reaction container at supply rates of 50 Nl/hr and 0.5 Nl/hr respectively. After 10 minutes, Modified Methyl Aluminoxane (MMAO) (0.9 mmol) and the catalyst (0.0030 mmol) prepared by the method described in paragraph "0112" in Japanese Unexamined Patent Publication No. 2010-241932 were added to the reaction container made of glass such that polymerization was initiated.

After 10 minutes, 5 ml of isobutyl alcohol was added thereto so as to stop the polymerization, thereby obtaining a polymerized solution containing a copolymer of ethylene, tetracyclododecene, and IndNB. Subsequently, the polymerized solution was moved to a beaker having a volume of 2 L that was additionally prepared, 5 ml of concentrated hydrochloric acid and a stirrer were added thereto, and a deliming operation was performed by bringing the copolymer into contact with the hydrochloric acid for 2 hours in a state of strongly stirring the solution. In a state of being stirred, the polymerized solution having undergone deliming was added to a beaker containing acetone that was about three times the volume of the polymerized solution, such that the copolymer was precipitated. The precipitated copolymer was separated from the filtrate by filtration. The obtained polymer containing the solvent was dried under reduced pressure for 10 hours at 130° C., thereby obtaining 0.58 g of a white powder-like ethylene·tetracyclododecene·indene norbornene copolymer.

In this way, a cyclic olefin-based copolymer (P-13) was obtained.

Manufacturing Examples 14 to 21

Cyclic olefin-based copolymers (P-14) to (P-21) described in Table 4 were obtained by performing the same operation as that in Manufacturing Example 13, except that the content of each of the constitutional units constituting the cyclic olefin-based copolymers was adjusted to the value described in Table 4.

In Table 4, BNBD means benzonorbornadiene represented by the following Formula (1), and IndNB means indene norbornene represented by the following Formula (2). MePhNB means methyl phenyl norbornene represented by the following Formula (3).

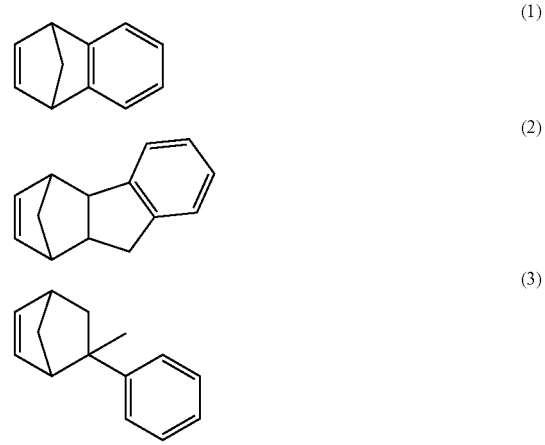

Examples 21 to 28 and Comparative Example 3

In each of the examples and the comparative examples, various physical properties were measured or evaluated by the following method. The obtained results are shown in Table 4.

[Method for Measuring Content of Each of Constitutional Units Constituting Cyclic Olefin-Based Copolymer]

The content of ethylene, tetracyclo[$4.4.0.1^{2,5}.1^{7,10}$]-3-dodecane, and the cyclic olefin having an aromatic ring was measured under the following conditions by using a nuclear magnetic resonance spectrometer "ECA 500" manufactured by JEOL Ltd.

Solvent: deuterated tetrachloroethane
Sample concentration: 50 to 100 g/l-solvent
Pulse repetition time: 5.5 seconds
Number of times of integration: 6,000 to 16,000
Measurement temperature: 120° C.

From a $^{13}$C-NMR spectrum measured under the above conditions, the composition of each of the ethylene, the tetracyclododecene, and the cyclic olefin having an aromatic ring was quantified.

[Glass Transition Temperature Tg (° C.)]

By using DSC-6220 manufactured by Shimadzu Corporation, a glass transition temperature Tg of the cyclic olefin-based copolymer was measured in a nitrogen (N2) atmosphere. The cyclic olefin-based copolymer was heated to 200° C. from room temperature at a heating rate of 10° C./min and then kept as it was for 5 minutes. Thereafter, the copolymer was cooled to −20° C. at a cooling rate of 10° C./min and then kept as it was for 5 minutes. From a heat absorption curve formed at the time of heating the copolymer to 200° C. at a heating rate of 10° C./min, the glass transition temperature (Tg) of the cyclic olefin-based copolymer was determined.

[Intrinsic Viscosity [η]]

By using a mobile viscometer (manufactured by RIGO-SHA & Co., Ltd., type: VNR053U), 0.25 to 0.30 g of the cyclic olefin-based copolymer was dissolved in 25 ml of decalin, thereby obtaining a sample. Based on ASTM J1601, the specific viscosity of the cyclic olefin-based copolymer was measured at 135° C., a ratio between the specific viscosity and the concentration was extrapolated to 0, thereby determining an intrinsic viscosity [η] of the cyclic olefin-based copolymer.

(Evaluation of Cyclic Olefin-Based Copolymer Composition)

[Press Molding]

The powder obtained in Manufacturing Examples 13 to 21 was subjected to press molding under the condition of 250° C. by using a hand press machine manufactured by Toyo Seiki Seisaku-sho, Ltd., thereby preparing square plate-like test pieces having a thickness of 2 mm.

[γ-Ray Irradiation]

The square plate-like test pieces having a thickness of 2 mm obtained as above were irradiated with γ-rays at 20 kGy or 50 kGy.

[Transparency]

For each of the obtained square plate-like test pieces having a thickness of 2 mm and the test pieces just finished with the γ-ray irradiation, the inner haze was measured, and the transparency thereof was evaluated based on the following standards.

The inner haze was measured in benzyl alcohol by using a haze meter (NDH-20D manufactured by NIPPON DEN-SHOKU INDUSTRIES Co., LTD).

O: the inner haze was less than 6.0%.

X: the test piece appeared turbid, or the inner haze was equal to or higher than 6.0%.

[Evaluation: Color Immediately After γ-Ray Irradiation]

The test pieces just finished with the γ-ray irradiation were stacked on white paper until the thickness thereof became 20 mm. At this time, the color and brightness thereof were visually evaluated.

The color was based on the Munsell color system. The evaluation standards are as below.

A (excellent): the brightness was 7 to 9.5, and the color was between 5.0 GY and 10 GY B (normal): the brightness was 5 to 9.5, and the color was between 5 Y and 5 GY; here, a case corresponding to A (excellent) was ruled out.

C (bad): the brightness was equal to or higher than 0 and less than 5 and/or the color was between 2.5 Y and 5 Y; here, a case corresponding to B (normal) was ruled out.

The evaluation standards will be more specifically described.

It has been revealed that the higher the brightness, the closer the sample to white, and the discoloration is further inhibited.

Regarding the color, assuming that the composition is used particularly as a medical container, it is apprehended that yellow may give an impression of being dirty to patients. Therefore, green was regarded as being more preferable than yellow.

[Evaluation: Amount of Radicals 5 Days and 1 Month After γ-Ray Irradiation]

The amount of radicals in a sample 5 days and 1 month after the γ-ray irradiation was measured by Electron Spin Resonance (ESR).

Specifically, 5 days and 1 month after the irradiation with γ-rays at a doses of 20 kGy and 50 kGy, about 6 mg of a sample was cut from each of the test pieces, put into a test tube (see the following description for more detail), and an ESR spectrum thereof was measured under the following conditions.

Device: electron spin resonance spectrometer JES-TE200 manufactured by JEOL Ltd.
Resonant frequency: 9.2 GHz
Microwave input: 1 mW
Central field: 326.5 mT
Sweep range: ±15 mT
Modulation frequency: 100 kHz
Sweep time: 8 min
Time constant: 0.1 sec
Amplification degree: 25
Test tube: test tube with quartz tip for X band
External standard: Mn2+ standard sample supported on magnesium oxide
External standard memory: 0,700
Measurement temperature: room temperature
Measurement atmosphere: the atmosphere For the relative comparison of the amount of generated radicals, a normalized value expressed as the following equation was used.

Amount of generated radicals (normalized value)
=area of portion corresponding to organic radicals in spectrum/area of portion (second signal) corresponding to Mn2+ in spectrum×amount of pellets The baseline of the ESR spectrum was corrected based on Mn2+ (second signal).

Generally, in the relative comparison of amount of radicals, for the area of the signal derived from Mn2+ as a standard, Mn2+ (third signal) is used. However, because the spectrum of the signal derived from organic radicals overlapped Mn2+ (third signal), only Mn2+ (second signal) was used in ESR performed in the present example (external standard memory=700).

Furthermore, in a case where the signal derived from organic radicals overlapped Mn2+ (third signal), the amount of generated radicals was calculated using an ESR spectrum of an external standard memory=0.

TABLE 4

| Resin | Example 21 | Example 22 | Example 23 | Example 24 | Example 25 | Example 26 | Example 27 | Example 28 | Comparative Example 3 |
|---|---|---|---|---|---|---|---|---|---|
| Cyclic olefin-based copolymer | P-13 | P-14 | P-15 | P-16 | P-17 | P-18 | P-19 | P-20 | P-21 |
| Cyclic olefin having aromatic ring from which constitutional unit (C) is derived | IndNE | IndNE | IndNE | BNBD | BNBD | IndNE | MePhNB | MePhNB | N/A |

TABLE 4-continued

| Resin | Example 21 | Example 22 | Example 23 | Example 24 | Example 25 | Example 26 | Example 27 | Example 28 | Comparative Example 3 |
|---|---|---|---|---|---|---|---|---|---|
| Constitutional unit (A) (derived from ethylene) (mol %) | 60.7 | 64.3 | 64.1 | 65.0 | 63.0 | 65.2 | 63.0 | 65.6 | 65.9 |
| Constitutional unit (B) (derived from tetracyclododecene) (mol %) | 29.6 | 29.2 | 31.8 | 31.0 | 21.0 | 32.6 | 27.0 | 31.2 | 34.1 |
| Constitutional unit (C) (mol %) | 9.7 | 6.5 | 4.1 | 4.0 | 16.0 | 2.2 | 10.0 | 3.2 | 0.0 |
| Content of constitutional unit (C) with respect to total content of 100 mol % of (A), (B), and (C) (mol %) | 9.7 | 6.5 | 4.1 | 4.0 | 16.0 | 2.2 | 10.0 | 3.2 | 0.0 |
| Content of constitutional unit (C) with respect to total content of 100 mol % of (B) and (C) (mol %) | 24.7 | 18.2 | 11.4 | 11.4 | 43.2 | 6.3 | 27.0 | 9.3 | 0.0 |
| [η] (dl/g) | 0.54 | 0.65 | 0.69 | 0.45 | 0.47 | 0.78 | 0.45 | 0.45 | 0.51 |
| Tg (° C.) | 161 | 150 | 150 | 144 | 147 | 147 | 143 | 136 | 145 |
| Transparency | ○ | ○ | ○ | ○ | ○ | ○ | ○ | ○ | ○ |
| Color after γ-ray (20 kGy) irradiation | A | A | A | A | A | A | A | A | C |
| Color after γ-ray (50 kGy) irradiation | A | A | A | A | A | A | A | A | C |
| Amount of radicals 5 days after γ-ray (20 kGy) irradiation | 0.4 | 0.4 | 0.3 | 0.4 | 0.3 | 0.4 | 0.4 | 0.3 | 60 |
| Amount of radicals 5 days after γ-ray (50 kGy) irradiation | 0.3 | 0.4 | 0.4 | 0.4 | 0.3 | 47 | 0.3 | 0.3 | 120 |
| Amount of radicals 1 month after γ-ray (50 kGy) irradiation | 0.2 | 0.3 | 0.2 | 0.3 | 0.2 | 0.1 | 0.2 | 0.2 | 1.2 |

As shown in the above table, the molded articles (sheets) constituted with the cyclic olefin-based copolymer compositions obtained in Examples 21 to 28 were excellent in the balance between performances such as transparency and γ-ray resistance. In contrast, Comparative Example 3, in which a cyclic olefin-based copolymer that did not contain the constitutional unit (C) derived from a cyclic olefin having an aromatic ring was used, was poor in the balance between performances such as transparency and γ-ray resistance.

The present application claims priorities based on Japanese Patent Application No. 2017-228675 filed on Nov. 29, 2017 and Japanese Patent Application No. 2018-138691 filed on Jul. 24, 2018, the entire disclosure of which is incorporated into the present specification.

The invention claimed is:
1. A cyclic olefin-based copolymer comprising:
a constitutional unit (A) derived from an α-olefin having 2 to 20 carbon atoms;
a constitutional unit (B) derived from a cyclic olefin without an aromatic ring; and
a constitutional unit (C) derived from a cyclic olefin having an aromatic ring,
wherein in a case where an injection molding sheet having a thickness of 1.0 mm is prepared using the cyclic olefin-based copolymer, an Abbe number (v) of the injection molding sheet is equal to or greater than 35 and equal to or smaller than 55.
2. The cyclic olefin-based copolymer according to claim 1,
wherein in a case where a total content of the constitutional unit (A), the constitutional unit (B), and the constitutional unit (C) in the cyclic olefin-based copolymer is 100 mol %, a content of the constitutional unit (A) in the cyclic olefin-based copolymer is equal to or greater than 10 mol % and equal to or smaller than 80 mol %.
3. The cyclic olefin-based copolymer according to claim 1,
wherein in a case where a total content of the constitutional unit (B) and the constitutional unit (C) in the cyclic olefin-based copolymer is 100 mol %, a content of the constitutional unit (C) in the cyclic olefin-based copolymer is equal to or greater than 5 mol % and equal to or smaller than 95 mol %.
4. The cyclic olefin-based copolymer according to claim 1,
wherein the cyclic olefin without an aromatic ring contains a compound represented by the following Formula (B-1),

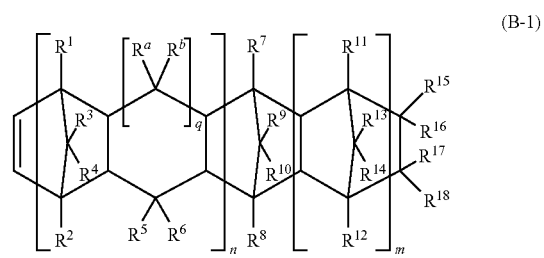

(B-1)

in Formula [B-1], n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, $R^{15}$ and $R^{16}$ or $R^{17}$ and $R^{18}$ may form an alkylidene group, and the compound represented by Formula [B-1] does not have an aromatic ring.
5. The cyclic olefin-based copolymer according to claim 1,
wherein the cyclic olefin having an aromatic ring contains one kind of compound or two or more kinds of compounds selected from the group consisting of a compound represented by the following Formula (C-1), a compound represented by the following Formula (C-2), and a compound represented by the following Formula (C-3),

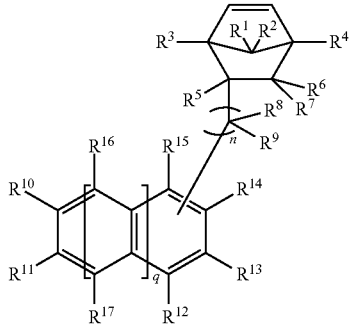

(C-1)

in Formula (C-1), n and q each independently represent 0, 1, or 2, $R^1$ to $R^{17}$ each independently represent a hydrogen atom, a halogen atom except for a fluorine atom, or a hydrocarbon group having 1 to 20 carbon atoms that may be substituted with a halogen atom except for a fluorine atom, one of $R^{10}$ to $R^{17}$ is a bond, in a case where q=0, $R^{10}$ and $R^{11}$, $R^{11}$ and $R^{12}$, $R^{12}$ and $R^{13}$, $R^{13}$ and $R^{14}$, $R^{14}$ and $R^{15}$, or $R^{15}$ and $R^{10}$ may form a monocyclic ring or a polycyclic ring by being bonded to each other, in a case where q=1 or 2, $R^{10}$ and $R^{11}$, $R^{11}$ and $R^{17}$, $R^{17}$ and $R^{17}$, $R^{17}$ and $R^{12}$, $R^{12}$ and $R^{13}$, $R^{13}$ and $R^{14}$, $R^{14}$ and $R^{15}$, $R^{15}$ and $R^{16}$, $R^{16}$ and $R^{16}$, or $R^{16}$ and $R^{10}$ may form a monocyclic ring or a polycyclic ring by being bonded to each other, the monocyclic ring or the polycyclic ring may have a double bond, and the monocyclic ring or the polycyclic ring may be an aromatic ring,

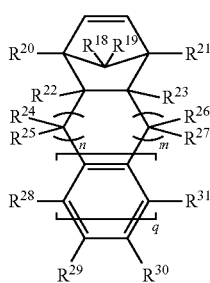

(C-2)

in Formula (C-2), n and m each independently represent 0, 1, or 2, q represents 1, 2, or 3, $R^{18}$ to $R^{31}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{28}$ and $R^{29}$, $R^{29}$ and $R^{30}$, or $R^{30}$ and $R^{31}$ may form a monocyclic ring or a polycyclic ring by being bonded to each other, in a case where q=2 or 3, $R^{28}$ and $R^{28}$, $R^{28}$ and $R^{29}$, $R^{29}$ and $R^{30}$, $R^{30}$ and $R^{31}$, or $R^{31}$ and $R^{31}$ may form a monocyclic ring or a polycyclic ring by being bonded to each other, the monocyclic ring or the polycyclic ring may have a double bond, and the monocyclic ring or the polycyclic ring may be an aromatic ring,

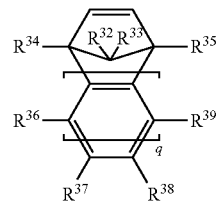

(C-3)

in Formula (C-3), q represents 1, 2, or 3, $R^{32}$ to $R^{39}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{36}$ and $R^{37}$, $R^{37}$ and $R^{38}$, or $R^{38}$ and $R^{39}$ may form a monocyclic ring or a polycyclic ring by being bonded to each other, in a case where q=2 or 3, $R^{36}$ and $R^{36}$, $R^{36}$ and $R^{37}$, $R^{37}$ and $R^{38}$, $R^{38}$ and $R^{39}$, or $R^{39}$ and $R^{39}$ may form a monocyclic ring or a polycyclic ring by being bonded to each other, the monocyclic ring or the polycyclic ring may have a double bond, and the monocyclic ring or the polycyclic ring may be an aromatic ring.

6. The cyclic olefin-based copolymer according to claim 1,
wherein a glass transition temperature (Tg) of the cyclic olefin-based copolymer measured using a differential scanning calorimeter (DSC) is equal to or higher than 120° C. and equal to or lower than 180° C.

7. A cyclic olefin-based copolymer comprising:
a constitutional unit (A) derived from an α-olefin having 2 to 20 carbon atoms;
a constitutional unit (B) derived from a cyclic olefin without an aromatic ring; and
a constitutional unit (C) derived from a cyclic olefin having an aromatic ring,
wherein in a case where an injection molding sheet having a thickness of 1.0 mm is prepared using the cyclic olefin-based copolymer, a birefringence of the injection molding sheet is equal to or higher than 1 nm and equal to or lower than 200 nm.

8. The cyclic olefin-based copolymer according to claim 1,
wherein the cyclic olefin having an aromatic ring contains at least one kind of compound selected from benzonorbornadiene, indene norbornene, and methyl phenyl norbornene.

9. A cyclic olefin-based copolymer composition comprising:
the cyclic olefin-based copolymer according to claim 1.

10. The cyclic olefin-based copolymer composition according to claim 9, further comprising:
a hydrophilic stabilizer.

11. A molded article comprising:
the cyclic olefin-based copolymer according to claim 1.

12. The molded article according to claim 11 is an optical lens.

13. The cyclic olefin-based copolymer according to claim 7,
wherein in a case where a total content of the constitutional unit (A), the constitutional unit (B), and the constitutional unit (C) in the cyclic olefin-based copolymer is 100 mol %, a content of the constitutional unit (A) in the cyclic olefin-based copolymer is equal to or greater than 10 mol % and equal to or smaller than 80 mol %.

14. The cyclic olefin-based copolymer according to claim 7,
wherein in a case where a total content of the constitutional unit (B) and the constitutional unit (C) in the cyclic olefin-based copolymer is 100 mol %, a content of the constitutional unit (C) in the cyclic olefin-based copolymer is equal to or greater than 5 mol % and equal to or smaller than 95 mol %.

15. The cyclic olefin-based copolymer according to claim 7,
wherein the cyclic olefin without an aromatic ring contains a compound represented by the following Formula (B-1),

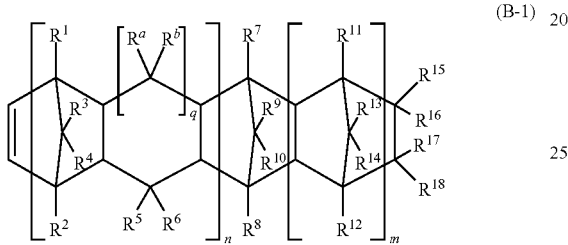

(B-1)

in Formula [B-1], n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, $R^{15}$ and $R^{16}$ or $R^{17}$ and $R^{18}$ may form an alkylidene group, and the compound represented by Formula [B-1] does not have an aromatic ring.

16. The cyclic olefin-based copolymer according to claim 7,
wherein the cyclic olefin having an aromatic ring contains one kind of compound or two or more kinds of compounds selected from the group consisting of a compound represented by the following Formula (C-1), a compound represented by the following Formula (C-2), and a compound represented by the following Formula (C-3),

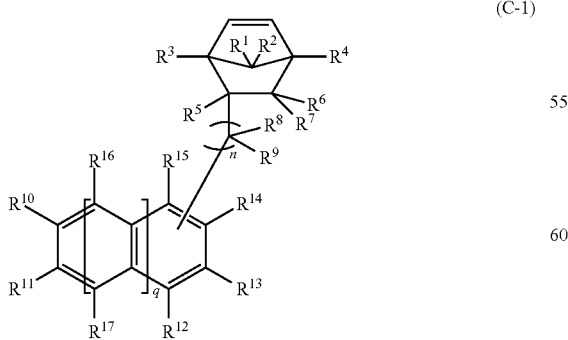

(C-1)

in Formula (C-1), n and q each independently represent 0, 1, or 2, $R^1$ to $R^{17}$ each independently represent a hydrogen atom, a halogen atom except for a fluorine atom, or a hydrocarbon group having 1 to 20 carbon atoms that may be substituted with a halogen atom except for a fluorine atom, one of $R^{10}$ to $R^{17}$ is a bond, in a case where q=0, $R^{10}$ and $R^{11}$, $R^{11}$ and $R^{12}$, $R^{12}$ and $R^{13}$, $R^{13}$ and $R^{14}$, $R^{14}$ and $R^{15}$, or $R^{15}$ and $R^{10}$ may form a monocyclic ring or a polycyclic ring by being bonded to each other, in a case where q=1 or 2, $R^{10}$ and $R^{11}$, $R^{11}$ and $R^{17}$, $R^{17}$ and $R^{17}$, $R^{17}$ and $R^{12}$, $R^{12}$ and $R^{13}$, $R^{13}$ and $R^{14}$, $R^{14}$ and $R^{15}$, $R^{15}$ and $R^{16}$, $R^{16}$ and $R^{16}$, or $R^{16}$ and $R^{10}$ may form a monocyclic ring or a polycyclic ring by being bonded to each other, the monocyclic ring or the polycyclic ring may have a double bond, and the monocyclic ring or the polycyclic ring may be an aromatic ring,

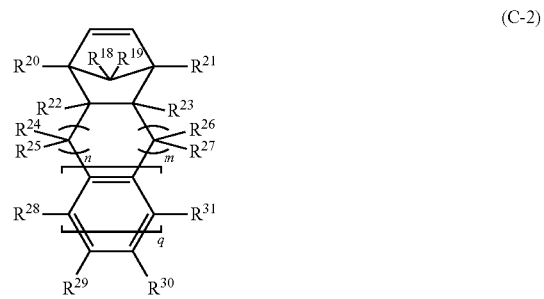

(C-2)

in Formula (C-2), n and m each independently represent 0, 1, or 2, q represents 1, 2, or 3, $R^{18}$ to $R^{31}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{28}$ and $R^{29}$, $R^{29}$ and $R^{30}$, or $R^{30}$ and $R^{31}$ may form a monocyclic ring or a polycyclic ring by being bonded to each other, in a case where q=2 or 3, $R^{28}$ and $R^{28}$, $R^{28}$ and $R^{29}$, $R^{29}$ and $R^{30}$, $R^{30}$ and $R^{31}$, or $R^{31}$ and $R^{31}$ may form a monocyclic ring or a polycyclic ring by being bonded to each other, the monocyclic ring or the polycyclic ring may have a double bond, and the monocyclic ring or the polycyclic ring may be an aromatic ring,

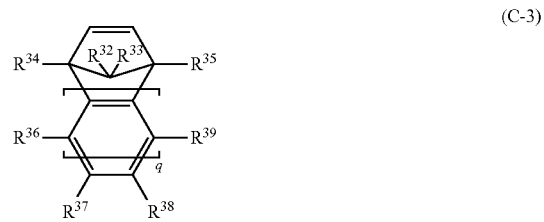

(C-3)

in Formula (C-3), q represents 1, 2, or 3, $R^{32}$ to $R^{39}$ each independently represent a hydrogen atom, a halogen atom except for a fluorine atom, or a hydrocarbon group having 1 to 20 carbon atoms that may be substituted with a halogen atom except for a fluorine atom, in a case where q=1, $R^{36}$ and $R^{37}$, $R^{37}$ and $R^{38}$, or $R^{38}$ and $R^{39}$ may form a monocyclic ring or a polycyclic ring by being bonded to each other, in a case where q=2 or 3, $R^{36}$ and $R^{36}$, $R^{36}$ and $R^{37}$, $R^{37}$ and $R^{38}$, $R^{38}$ and $R^{39}$, or $R^{39}$ and $R^{39}$ may form a monocyclic ring or a polycyclic ring by being bonded to each other, the monocyclic ring or the polycyclic ring may have a double bond, and the monocyclic ring or the polycyclic ring may be an aromatic ring.

17. The cyclic olefin-based copolymer according to claim 7,
wherein a glass transition temperature (Tg) of the cyclic olefin-based copolymer measured using a differential scanning calorimeter (DSC) is equal to or higher than 120° C. and equal to or lower than 180° C.

18. The cyclic olefin-based copolymer according to claim 7,
wherein the cyclic olefin having an aromatic ring contains at least one kind of compound selected from benzonorbornadiene, indene norbornene, and methyl phenyl norbornene.

19. A cyclic olefin-based copolymer composition comprising:
the cyclic olefin-based copolymer according to claim 7.

20. The cyclic olefin-based copolymer composition according to claim 19, further comprising:
a hydrophilic stabilizer.

21. A molded article comprising:
the cyclic olefin-based copolymer according to claim 7.

22. The molded article according to claim 21 that is an optical lens.

* * * * *